United States Patent
Sato

(10) Patent No.: US 7,050,695 B2
(45) Date of Patent: May 23, 2006

(54) OPTICAL COMMUNICATION SYSTEM

(75) Inventor: Masataka Sato, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 11/052,301

(22) Filed: Feb. 8, 2005

(65) Prior Publication Data

US 2005/0201713 A1 Sep. 15, 2005

(30) Foreign Application Priority Data

Mar. 12, 2004 (JP) .............................. 2004-071220

(51) Int. Cl.
G02B 6/02 (2006.01)

(52) U.S. Cl. .................. 385/143; 385/123; 385/145

(58) Field of Classification Search ................ 385/123, 385/124, 143, 145
See application file for complete search history.

(56) References Cited

U.S. PATENT DOCUMENTS

| | | | | |
|---|---|---|---|---|
| 4,842,626 A | * | 6/1989 | Barns et al. .................. 65/426 |
| 5,093,888 A | * | 3/1992 | Takezawa et al. ........... 385/141 |
| 6,608,309 B1 | * | 8/2003 | Ikeda et al. ............. 250/339.06 |
| 6,704,485 B1 | * | 3/2004 | Campion et al. ............ 385/123 |
| 6,859,595 B1 | * | 2/2005 | Kato et al. ................... 385/123 |
| 2004/0200241 A1 | * | 10/2004 | Otosaka et al. ............... 65/413 |
| 2005/0152653 A1 | * | 7/2005 | Jang et al. ................... 385/123 |

FOREIGN PATENT DOCUMENTS

| | | | |
|---|---|---|---|
| JP | 2-16504 A | | 1/1990 |
| JP | 5-181023 A | | 1/1993 |
| JP | 5-224033 A | | 9/1993 |
| JP | 6-194530 A | | 7/1994 |
| JP | 6-297596 A | | 10/1994 |
| JP | 8-5848 A | | 1/1996 |
| WO | WO 93/08488 | * | 4/1993 |
| WO | WO 03/008488 A1 | | 1/2003 |

OTHER PUBLICATIONS

Y. Koike, "Optical Properties of Polymer", Kyoritsu Shuppan Co., Ltd., Oct. 20, 1994.
T. Kaino, "Study of Decreasing Transmission Loss of Plastic Optical Fiber".

* cited by examiner

Primary Examiner—John D. Lee
(74) Attorney, Agent, or Firm—Sughrue Mion, PLLC

(57) ABSTRACT

A transmission loss of each dried and water-saturated plastic optical fiber (POF) is measured. In range from 500 nm to 720 nm and from 785 nm to 810 nm, the transmission loss P1 of the dried POF and a difference of the transmission loss from the water-saturated POF to the dried POF satisfy at least one of the conditions, $0 \leq L/P1 \leq 1$, $0 < L \leq 100$ and $10 \leq L+P1 \leq 200$. Further, in the wavelength range from the ultraviolet ray to infrared ray, the absorption wavelength of OH vibration in water contained in the POF and the absorption wavelength X of harmonic absorptions of atomic vibrations are detected, and the above conditions are the wavelength ranges except the absorption wavelength X. In the performance of optical communication in these wavelength ranges, the transmission loss does not increase so much even when the the POF absorbs water. Therefore the adequate optical communication can be performed stably.

8 Claims, 11 Drawing Sheets

OPTICAL COMMUNICATION SYSTEM

BACKGROUND OF THE INVENTION

1. Field of the Invention

The present invention relates to an optical communication system, more especially to an optical communication system with use of a light-transmitting medium, such as a plastic optical fiber and the like.

2. Description Related to the Prior Art

In a light-transmitting medium (such as an optical fiber, an optical lightguide, an optical lens and the like), plastic materials are more excellent than a quarts materials, usually in points of workability for molding, weight saving of parts, lower cost, flexibility, impact resistance and the like. However, for example, it is usually not preferable to use a plastic optical fiber (POF) for an optical transmission for a long distance, since the transmission loss of the light is larger in the POF than the quartz optical fiber. On account of the characteristics of plastics, a diameter of a core of the POF can be enlarged in a low cost, so as to be equal to or more than 10 μm. Further, in the enlargement of the diameter, it becomes unnecessary to more precisely connect an optical fiber to several peripheral parts and devices to be used for branching or connecting the optical fibers. Therefore, the POF has merits of the easiness of connecting the peripheral parts and devices, the easiness for the end processing, the unnecessity of alignment, and the like. Furthermore, because of the characteristics of plastics, the POF has merits of not only the decrease of the cost at the connector, but also a low dangerousness of sticking into a human body, an easiness of processing that is caused by the high flexibility, an easiness of laying, a resistance to vibration and the like. Thus the POF attracts attentions for using not only in home or car, but also for an interconnection in a high speed data processor, a extremely short cable with high capacity in a DVI (digital Video Interface) and the like.

Recently, instead of the quartz optical fiber with which the communication of the wavelength at 780 nm, 850 nm or the like can be made, Japanese Patent Laid-Open Publications No. 5-224033 (see Page 3) and 8-5848 (see Pages 3–7) suppose a POF containing fluorine, a POF in which deuterium atoms is substituted for hydrogen atoms, and the like, with which the transmission loss is low even in the wavelength range of near-infrared ray.

The POF is constructed of a core and a clad. Usually, the core is a central part made of organic compounds in which the polymers form a matrix. The clad is an outer part having a lower refractivity than the core.

As a production method of the POF, there are a method in which the polymer is extracted in a fiber-shape to form a core and a clad simultaneously, and a method in which a preform is produced and thereafter drawn with heating in an atmosphere from 180° C. to 250° C.

Several methods of forming the preform are proposed. As a forming a clad portion of the preform, there is a melt-extrusion method of the polymer, a method in which the monomers (methylmethacrylate and the like) is supplied in a case having a resiliency and the case is rotated to make the polymerization of the monomers.

In the tube-shaped clad portion, a core portion having the refractive index distribution is formed. As a method of providing the refractive index distribution for the core portion, the Japanese Patent Laid-Open Publication No. 2-16504 (see, Pages 2–3) teaches a method in which two or more sorts of polymers having different refractive indices or different ratio of refractive index changes overlay to form a multi-layer material, and extruded in cocentrical arrangement to form the core portion. Further, in the Japanese Patent Laid-Open Publications No. 5-181023 (Pages 3–6) & 6-194530 (Pages 3–7) teach a method in which are mixed polymerization initiators and monomers forming a different polymer from that of the clad portion. In this method, while the mixture is dripped into an inner space in the clad portion, the mixture is heated to make the polymerization. Furthermore, in a method described in a brochure of International Publication under PCT No. 03/08488, after a mixture of a monomers, a refractive index modifier and polymerization initiator is filled in the clad portion, the polymerization is made in the heating to form the core portion, and concentration distribution of refractive index modifier contained in the core portion provides the refractive index distribution. Further, in the method in the Japanese Patent Laid-Open Publications No. 6-297596, the mixture ratio of the polymers having different refractive indexes is continuously varied.

However, the polymer (such as PMMA, PC or the like) of the light-transmitting medium as the above POF is absorbable of water, and when the POF absorbs water, the transmission loss becomes larger, and larger in the wave length range of the near-infrared ray. Since the water absorbability of the polymer cannot be made zero, the optical communication with use of the POF become unstable in the near-infrared ray wavelength range.

SUMMARY OF THE INVENTION

An object of the present invention is to provide an optical communication system in which the transmission loss does not increase even when the POF absorbs water.

In order to achieve the object and the other object, an optical communication system includes a plastic light-transmitting medium for transmitting a light from an infrared ray to an ultraviolet ray. When a wavelength of a light to be absorbed for hydroxyl group vibration in water contained in the plastic light-transmitting medium is an absorption wavelength, a communication wavelength is different from the absorption wavelength.

The absorption wavelength of OH-vibration includes the wavelengths of the light in harmonic absorptions, which is to be absorbed for atomic vibrations. When a light is illuminated onto a material, the light of the wavelength, which resonates with the stretching vibration and the deformation vibration of the bonds between atoms, is absorbed into the material. The harmonic absorptions occur in a shorter wavelength side than the first absorption.

Preferably, when a transmission loss of a light transmitted through the dried light-transmitting medium is P1 and a difference of the transmission loss from the water-saturated light-transmitting medium to the dried one is L, the transmission loss P1 and the difference L satisfies at least one of following conditions:

$$0 \leq L/P1 \leq 1;\ 0 < L \leq 100;\ \text{and}\ 0 < L + P1 \leq 200.$$

The communication wavelength is preferably in at least one of the rigions of 500 nm to 720 nm and 785 nm to 810 nm, and especially in the range of 785 nm to 810 nm.

In an preferable embodiment, at least a light guide portion of the plastic light-transmitting medium is formed of an amorphous polymer containing deuterium atoms, and a water absorption of the amorphous polymer is in the range of 0.01% to 5%.

In another preferable embodiment, the plastic light-transmitting medium has a first portion for transmitting the light and a second portion whose refractive index is lower than that of the first portion. The refractive index of the first portion continuously varies in a direction perpendicular to a transmitting direction of the light. The plastic light-transmitting medium is a POF.

According to the optical communication system of the present invention, even if the light communication medium, such as the POF and the like, absorbs water, the transmission loss doesn't increase in the wavelength range close to that of a near infrared ray. Therefore the stable communication can be made continuously.

BRIEF DESCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Figure 1:
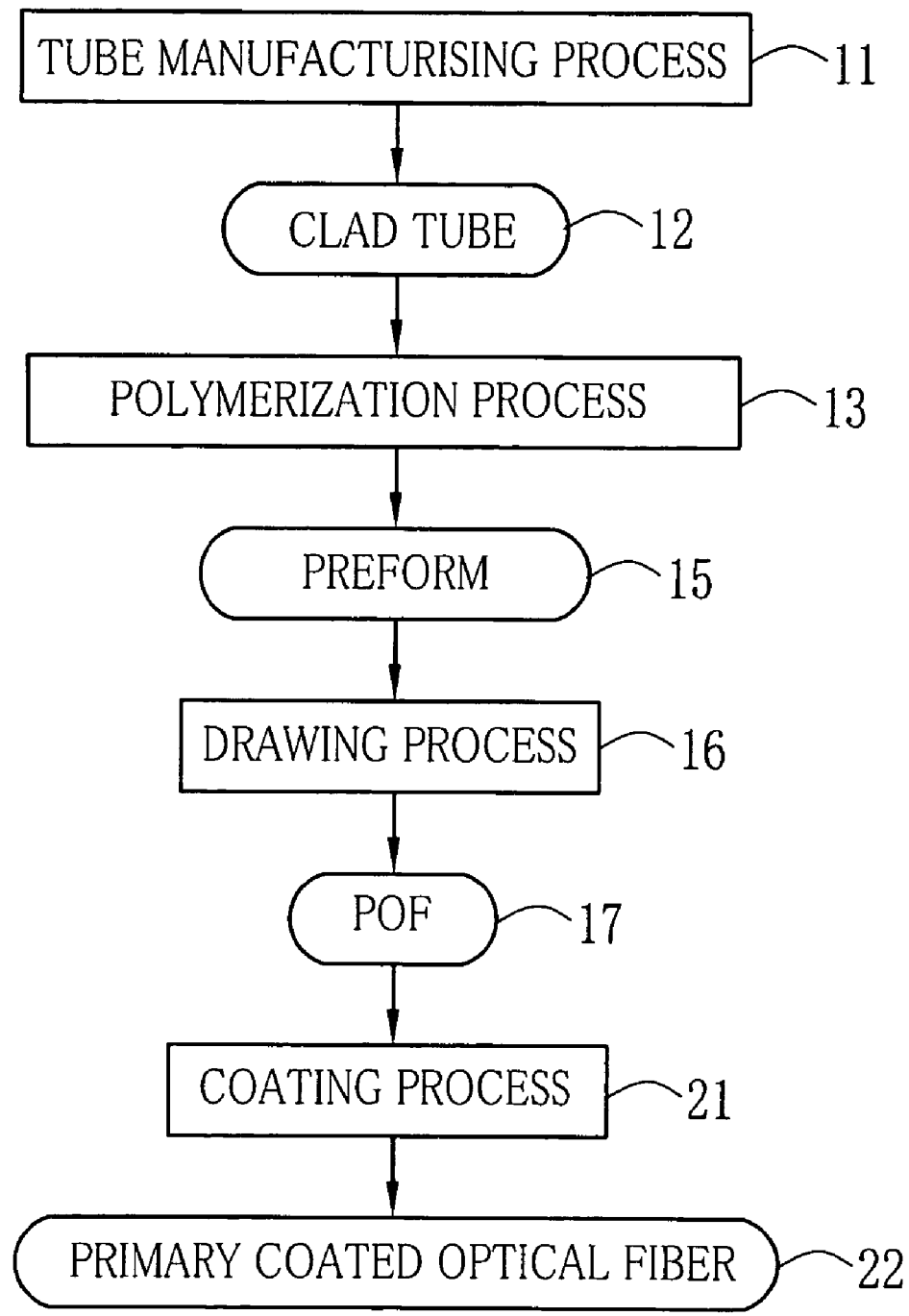
FIG. 1 is a flow chart of forming a preform for a POF of the present invention.

In processes of producing a plastic optical fiber (POF) 17 and a primary coated optical fiber 22, as shown in FIG. 1, a clad tube 12 is manufactured at first in a tube manufacturing process 11, and to be used for a clad portion 31 as an outer portion of a preform 15 (see, FIG. 2) of the POF 17. Then in a polymerization process 13, polymerizable compounds are polymerized in the clad tube 12 to form a core portion 30 (see, FIG. 2). Thus the cylinder shaped preform 15 is obtained. In a drawing process 16, the preform 15 is heated and drawn in a lengthwise direction, so as to form the POF 17. Note that the preform 15 has effects of the optical transmission medium even though not drawn to the POF 17. Further, a periphery of the POF 17 is coated with a coating material in a coating process 21, and thus a plastic optical code 22 is obtained. Usually in the coating process 21, as described later, a primary coating is formed and thereafter, if necessary, a secondary coating is formed. However, the number of the coatings formed in the coating process 21 is not restricted in 1 or 2. In the present invention, if necessary, the one plastic optical fiber code is further coated with a coating layer, such that a single fiber cable is obtained. Otherwise, the plural plastic optical fiber codes are combined with a tension member and the like, and in this case, the coating of the combination is formed to obtain a multi fiber cable. The plastic fiber cable 22 includes the single fiber cable and the multi fiber cable.

The embodiment of the POF and a production method thereof will be explained in followings. Note that the present invention is not restricted in the embodiment of the POF and the production method thereof, and can be applied to POF and production method thereof that are already known.

Outer and inner diameters of the clad tube 12 is constant in the lengthwise direction, the thickness is uniform, and an end of the clad tube 12 is stopped. The clad tube 12 of this embodiment is formed from a completely deuterized polymethyl methacrylate (PMMA-d8) as clad-monomers by a rotating polymerization method. Accordingly, the clad tube is a polymer polymerized from the clad-monomers of polymerizable compounds. The polymerization material used for forming the clad 12 is a clad monomer in this embodiment, and the polymers produced by polymerizing the clad monomers are called a clad polymer. The clad tube 12 of this embodiment can be produced by the rotating polymerization method in which a tube material is formed in the polymerization, the same as the case of producing the PMMA-8 from the completely deuterized MMA (MMA-d8). Otherwise, the polymer is produced from the clad-monomers, and the melt-extrusion is made such that the polymer may form the clad tube 12. Note that the raw materials of the clad tube and the producing method of the clad tube will be explained below.

Figure 2:
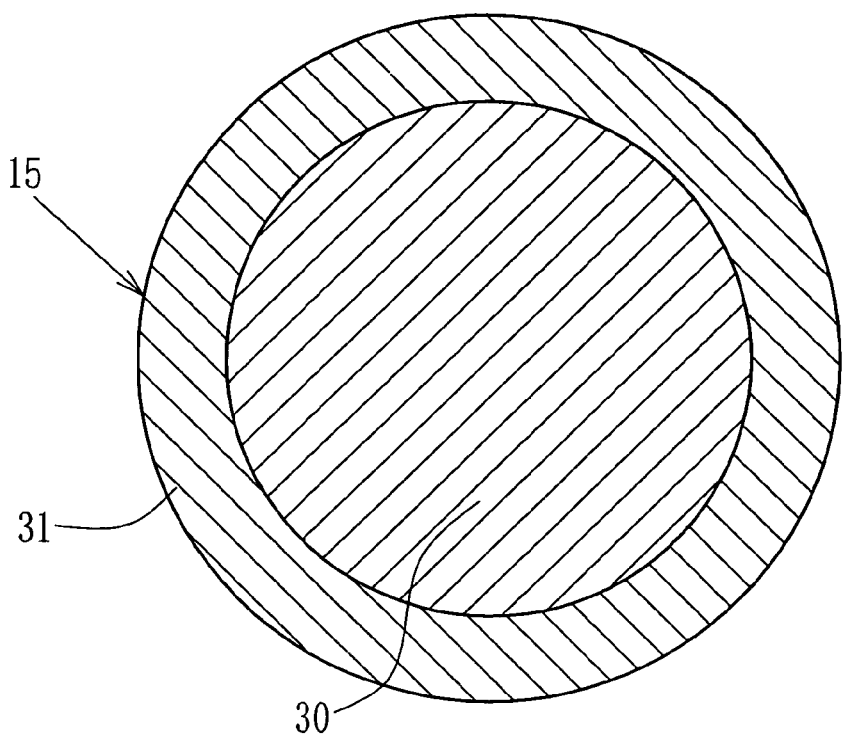
FIG. 2 is a cross-sectional view of the preform.

As shown in FIG. 2, the preform 15 includes the core portion 30 in a central part of a section of the preform 15, and the clad portion 31 on the core portion 30. The core portion 30 and the clad portion 31 respectively form a clad and a core of the POF 17.

Figure 3:
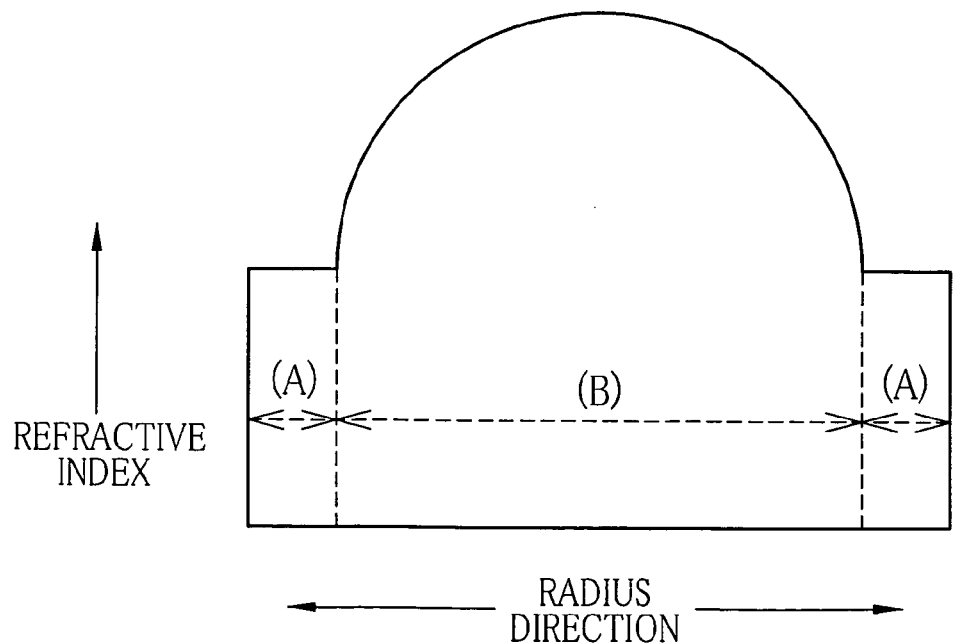
FIG. 3 is a graph illustrating a relation of refractive index and a radius direction of a preform.

In FIG. 3, a horizontal axis shows a length from an edge of the preform in the radial direction thereof, and a vertical direction shows a refractive index which increases in the above area. An area (A) is a refractive index of the clad portion 31 of the preform, and an area (B) is that of the core portion 30. The refractive index of the core portion 30 continuously becomes higher from an edge toward a center, and the refractive index of the clad portion 31 is lower than that of the core portion 30. The difference between the maximum and minimum of the refractive index in the radius direction of the preform 15 in section is preferably in the range of 0.001 to 0.3. In this structure, the preform 15 has a function of the light-transmitting medium, and thus is drawn in the lengthwise direction so as to form the POF, which is called GI-POF. Further, the core portion 30 is formed by the interfacial gel-polymerization method in the present invention, such that the refractive index of the core portion 30 of the produced preform 15 continuously becomes higher from the edge to the center.

In order to form the clad tube 12, a temperature of MMA-d8 as the clad monomer is adjusted to a predetermined value and the MMA-d8 is supplied into a cylindrical polymerization case having the predetermined size to make the polymerization. When the clad monomer is MMA-d8, also a predetermined amount of some additives is supplied into the polymerization case, for example, the polymerization initiator, molecular weight controller and the like. In the polymerization, it is preferable to make the deaeration of the polymerization case by the decompression and the like. After the preliminary polymerization, the polymerization case is set into a horizontal position, and rotated to make the polymerization. Thus the clad tube 12 is obtained.

The obtained clad tube 12 is removed from the polymerization case and heated for a predetermined time period with use of a heating device, such as a constant-temperature chamber and the like, whose temperature is set to a predetermined value. The preferable polymerizable compounds for forming the core portion 30 are monomers which are called core monomers. In this embodiment, the core monomer is MMA-d8. The present invention does not depend on the core monomer. However, it is preferable that the polymer produced by polymerizing the core monomer does not have any light hydrogen. Therefore it is preferable in this embodiment to use the MMA-d8 in which the deuterium is substituted for the hydrogen of methylmethacrylate. Thus the transmission loss can be reduced. The adequate core monomers are described later.

Preferably, the clad tube 12 before the supply of the core monomer is disposed under the decreased pressure for a predetermined time. Since this decompressing treatment is made, it is prevented that the volume of water and air contained in the polymer for the clad portion becomes larger in the heating during the polymerization of the core monomer so as to cause the deformation and cracks on an inner wall of the clad tube 31 or fluctuation of the molecular density in the preform 15.

Further, the MMA-d8 as the core monomer is injected into the clad tube 12 with the additives, such as the polymerization initiator, the chain transfer agent, the refractive index modifier (or dopant), and the like. Preferably, after the additives are previously added to the core monomers, a mixture of the additives and the core monomers is filtrated by a filtration apparatus, and then injected into the clad tube 12. The amount of the polymerization initiator and the chain transfer agent will be explained later. In this embodiment, a diphenyl sulfide is used as the dopant since it is characteristic in the high refractive index and the large molecular volume, and is a low-molecular compound which is not involved into the polymerization. Thus the refractive index of the core portion 30 changes in the radius direction as in FIG. 3. Note that the refractive index of the core portion 30 can be made variable in the radius direction also when the dopant is not used but at least two sorts of the core monomers are used.

Figure 4:
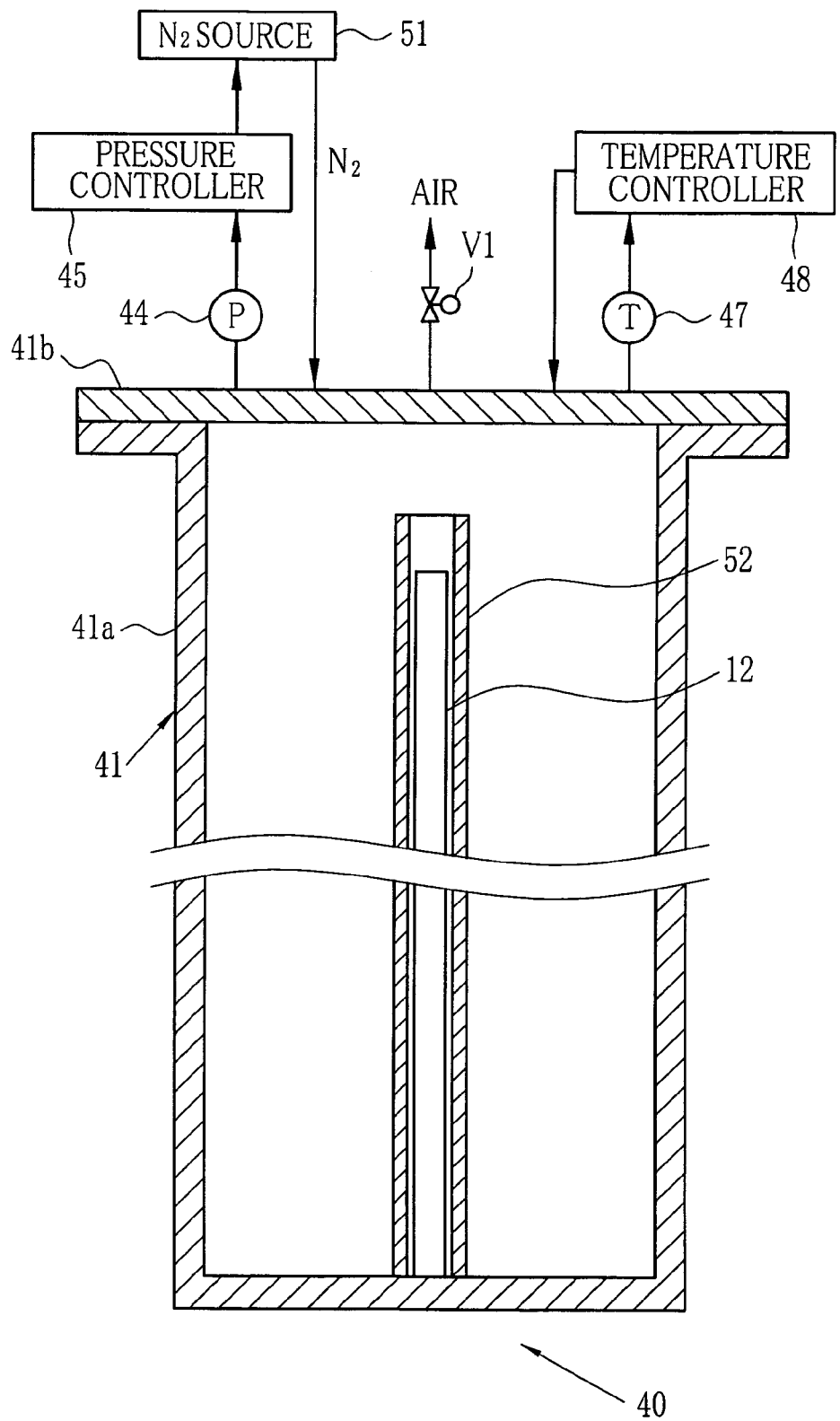
FIG. 4 is a sectional view of a polymerization apparatus for forming a core portion of the preform.

The polymerization of the core monomers is made with use of a polymerization apparatus 40 as shown in FIG. 4. The polymerization apparatus 40 includes a polymerization case 41, a pressure gauge 44, a pressure controller 45, a thermometer 47, and a temperature controller 48. Further, the polymerization case 41 is provided with a nitrogen source 51 for supplying nitrogen gas as the inert gas. Further, the polymerization case 41 has a main body 41a and a lid 41b which is fixed to the main body 41a with screws (not shown). Note that the present invention does not depend on the structure of the polymerization apparatus, and may be different from the polymerization apparatus 40 shown in FIG. 2.

The pressure gauge 44 measures the pressure in the polymerization case 41. The pressure controller 45 adjusts the supply rate of the nitrogen gas from the nitrogen source 51 on the basis of the result of the measurement of the pressure gauge 44. Thus the pressure in the polymerization case 41 is controlled. Further, the thermometer 47 measures the temperature in the polymerization case 41. The main body 41a includes a heating wire (not shown), and the temperature controller 48 controls the electric current flowing through the heating wire, on the basis of the result of the measurement of the thermometer 47. Thus the temperature in the polymerization case 41 is controlled. The supplied gas is not restricted in the nitrogen, but may be the inert gas, for example, argon and the like. In this embodiment, the inside of the polymerization case 41 is filled with the nitrogen gas, and the lid 41b is fixed to the mail body 41a with the screws such that the inner pressure and the supply amount into the polymerization case 41 may be accurately regulated.

The clad tube 12, which contains the mixture of the core monomers, the polymerization initiator, the chain transfer agent, the dopant and the like, is inserted into a glass tube 52 as a jig or a supporter, and thereafter the glass tube 52 is disposed in the main body 41a of the polymerization case 41, such that a lengthwise direction of the glass tube 52 may be the perpendicular direction. Before or after the disposure in the glass tube 52, it is preferable to make a deaeration treatment of the clad tube 12 in which the core monomer and the like are contained. As a method of the deaeration treatment, it is preferable to make the decompression in a decompression chamber and the like, in view of the easiness and the effect. In this embodiment, the decompression is made for 5 minutes. It is particularly preferable to effect a ultrasonic wave on the decompression treatment. Note that it is especially preferable to make the deaeration for 30 minutes or more.

After the lid 41b is fixed with the screws to the main body 41a of the polymerization case 41 in which is set the glass tube 52 containing the clad tube 12, the nitrogen gas is supplied from the nitrogen source 51 into the polymerization case 41. Thereby a valve V1 is opened such that the air is fed out and the nitrogen gas fills the polymerization case 41. When the polymerization case 41 is filled with the nitrogen gas, the inner pressure thereof is controlled by the pressure controller 45 to a predetermined value. Then the polymerization of the core monomer is made with the heating in control of the temperature controller 48. The polymerization is made at a predetermined temperature for a predetermined time. The pressure in the polymerization is controlled to a predetermined value by the pressure controller 45, so as to be more than the atmospheric pressure.

When the polymerization of the core monomers starts, the core monomers have the inner wall of the clad tube 12 swollen, so as to form a swollen layer in a primary step of the polymerization. The swollen layer is in a gel-state, and therefore the polymerization speed becomes higher, which is called a gel-effect. Further, the polymerization starts from the inner wall of the clad tube 12 and proceeds towards a center of the clad tube 12 in section, and the compounds whose molecular volume is small enter into the swollen layer preferentially. Since the dopant has the large molecular volume, it moves toward the center in the procedure of the polymerization. As a result, in the center of the formed core, the density of the dopant having the high refractive index becomes larger. Thus the preform 15 in which the refractive index becomes continuously higher toward the center in the radius direction as in FIG. 3 is obtained. Note in this embodiment that the core portion 30 and the clad portion 31 are made of the PMMA-d8 in which the deuterium atoms are entirely substituted for the hydrogen atoms. Since the preform 15 is produced with forming the swollen layer as described above, there is no clear borderline between the core portion 30 and the clad portion 31. Namely, although the borderline is illustrated in FIG. 2 for the easiness of the explanation, the clearness of the borderline between the core portion 30 and the clad portion 31 in the preform 15 is different depending on the production conditions, such as the materials of the clad or core portion, an affinity thereof, and whether it is designated to form a swollen layer.

In the polymerization of the core monomer, as shown in FIG. 4, it is preferable that the clad tube 12 containing the mixture for forming the core portion 30 is set in the polymerization case 41 with support of the jig, such as the glass tube and the like. The supporter preferably has a tube-like shape into whose inner space the clad tube 12 can be inserted. In the procedure of the polymerization under the increased pressure, a volume of the polymerizable compounds becomes smaller in procedure of the polymerization, and the upper surface of the core monomers retracts from the upper end of the clad tube 12. Thereby the shape of the clad tube 12 changes slightly. Accordingly, the clad tube 12 is supported without fixing the surface thereof by the supporter. When the clad tube 12 is fixed by the supporter, for example, the shape of the clad tube 12 cannot change in the shrink of mixture, which causes to generate voids in the center of the core portion 30 of the preform 15. Therefore, when the supporter has the tube-like shape, it is preferable that the inner diameter of the supporter is larger than the outer diameter of the clad tube 12. The difference from the inner diameter of the tube-like supporter to the outer diameter of the clad tube 12 is preferably in the range of 0.1% to 40% to the outer diameter, and particularly in the range of 10% to 20%. In this embodiment, the difference is 9% to the outer diameter. It is not necessary that the supporter has the tube-like shape, so far as the clad tube 12 can be perpendicularly disposed in the polymerization case 41 and can be supported even in the change of the shape of the clad tube 12.

The preferable range of the increased pressure in the polymerization is determined adequately depending on the core monomers to be used. When the pressure is too large, the gas dissolves into the core monomer, or the dissolved gas components cannot be gasified. Thus the gas components remaining in the core portion 31 forms voids in the drawing process 16 (see, FIG. 1) of the preform 15. Otherwise, when the pressure is too small, the shape of the clad tube 12 hardly changes responding to the volume shrink during the polymerization, such that the voids and the bubbles are often generated. In this embodiment, the pressure during the polymerization is preferably in the range of 0.01 MPa to 1.0 MPa. Thus the pressure during the polymerization is controlled, such that the generation of the voids and the bubbles in the core portion 30 of the preform 15 or the core of the POF may be reduced.

The polymerization is preferably made with the heating. The temperature is determined depending of the sort of the core monomer and the like, mainly in consideration of the polymerization speed and the alteration temperature. For example, if methacrylate low-molecular weight compounds (the typical core monomer) is used as a main content of the core portion 30, the temperature is preferably in the range of 50° C. to 150° C., and particularly in the range of 80° C. to 140° C. Further, the polymerization time is preferably from 4 to 48 hours. However, it is also determined depending on the sort of the core monomer.

Further, in this embodiment, after the polymerization with the heating under the increased pressure as described above, the heating treatment is made under the predetermined conditions, and after the polymerization the cooling is further made at a predetermined cooling speed under the increased pressure.

As described above, the preform 15 including the core portion 30 and the clad portion 31 can be formed as the light-transmitting medium to have a cylindrical shape, and fed to the drawing process 16. Then the drawing is made to obtain the POF whose diameter is, for example, in the range of 200 µm to 1000 µm.

By the way, when a light is illuminated onto a material, the light of the wavelength, which resonates with the stretching vibration and the deformation vibration of the bonds between atoms, is absorbed into the material. Accordingly, in the dried POF, since the transmission loss from 600 nm to 900 nm is low, the quantity of the absorbed light into the material is small. Otherwise, in the POF in which the water is absorbed, the transmission loss from 600 nm to 900 nm becomes large, and the light in this range is absorbed to the hydroxyl group of the absorbed water as a energy of the vibration of the hydroxyl group Therefore the transmission loss becomes extremely large.

An absorption wavelength of OH-vibration in water absorbed into the POF is described as X. The absorption wavelength X includes the wavelengths of harmonic overtone absorptions, which is to be absorbed for atomic vibrations. Note that the absorption wavelength X sometimes shifts towards a higher or lower wavelength range depending on the raw materials of the POF and the existence of the water in the POF. In the present invention, a communication wavelength is determined in the wavelength range other than the absorption wavelength X of OH-vibration of water absorbed to the POF. In performance of the communication at the communication wavelength, even though the POF as the light-transmitting medium absorbs water, the transmission loss does not become larger, and even though the absorbed amount of water changes, the fluctuation of the transmission loss is small. Thus, the stable communication can be continuously made. Note that some harmonic overtones come in a longer wavelength area than the fourth overtone at 750 nm, and the influence of the harmonic overtone absorptions of OH at these harmonic overtones, especially the lower ones, is large. Therefore, in the wavelength range equal to or more than 750 nm, it is especially preferable to make an optical communication in the harmonic range without the range of harmonic overtone absorbance. Thus the fluctuation of the transmission loss is small in the water absorption and an adequate optical transmission can be made. Further, in the recent year, several sorts of optical oscillator are increasingly proposed, in which the oscillation wavelength range becomes wider and the light in the predetermined wavelength range is selectively determined. Therefore the effectiveness of the present invention becomes larger. As just described, the preferable communication wavelength in the range of 600 to 900 nm is in the wavelength range except of the absorption wavelength X of OH-vibration in water absorbed into the POF.

If the transmission loss per 1 km is P1 (unit; dB/km) in the dried POF and P2 (unit; dB/km) in the water saturated POF, a difference P2−P1 of the transmission loss is described as an increased loss L (unit; dB/km). The preferable communication wavelength is in ranges in which the increased loss L and the transmission loss P1 satisfy at least one of conditions, $0 \leq L/P1 \leq 1$, $0 < L \leq 100$ and $10 \leq L+P1 \leq 200$.

If a ratio L/P1 of the increased loss L to the transmission loss P1 of the dried POF is less than zero, the transmission loss must become smaller in effect of the water, which cannot be realized in principle. If the ratio L/P1 is more than one, the fluctuation of the transmission loss becomes large, depending on the absorbed amount of water. Therefore, in this case, the POF cannot be utilized as the light-transmitting medium to be used under the several circumstances.

The increased loss L of the transmission loss can be theoretically closer to zero without end, when fluorine atoms are substituted for the hydrogen atoms on each material molecule so as to increase the transparency of the materials. Otherwise, the light of the wavelength at least 700 nm is influenced by water especially. In a case that a light source generating the light at least 700 nm, if the increased loss L is more than 100, the absorbed amount of the light becomes larger in effect of the water absorption, and therefore the light transmittance of the POF becomes worse in the situation that the water is absorbed.

For the value L+P1, there are wavelength ranges in which the influence of the water absorption can be disregarded. Therefore the lower limit of L+P1 is larger than zero. Otherwise, if L+P1 is larger than 200, the light intensity on the light source must be extremely large even in use for a communication at a short distance less than 100 m. Therefore, there are problems in security. In a range of the secure light intensity, for example, the intensity of the light transmitted for 100 m becomes $1/10^{20}$ lower, and the communication cannot be made enough.

The preferable wavelength described above will be explained in detail, with reference to measurement of the transmission losses of the dried POF and the water saturated POF. The wavelength of the light for the measurement is in the range of 500 nm to 900 nm, and the measurement is made with spectrum analyzer in the market. The dried POF is preferably dried enough at the predetermined temperature for the predetermined time under the decreased pressure. These drying conditions are not restricted especially, so far as the water is removed enough. For example, in the thermometeric chamber, the POF is stationary disposed at about 25° C. for 100 hours under degree of pressure reduction of $9 \times 10^4$ Pa. Otherwise, for the water saturated POF, it is concretely hard to detect in the measurement whether the POF is saturated with water. Therefore the saturation is determined on the basis of the absorbing speed of water into materials of the POF. For example, the water absorbing treatment is made at 40° C. for 240 hours in the thermometeric bath of relative humidity of 95%.

As the measuring method of the transmission loss, there are (1) a cut-back method, (2) insertion loss method, (3) an OTDR method, (4) a method with use of a model of loss wavelength characteristics and the like. In this embodiment, the cut-back method is used. In the cut-back method, part of the POF is cut off to a first sample having a predetermined first length Z1 (unit; m), and a white light enters into the sample. An intensity Li1 of the exit light of a predetermined wavelength λ is measured after propagating through the first sample of the first length Z1. Then part of a predetermined length Zp (unit; m) of the first sample is cut off such that a second sample having a second length Z2 (=(Z1−Zp)) may be obtained. An intensity Li2 of the exit light from the second sample is measured in the same manner as in the measurement of the first sample. On the basis of the results of the measurement, the transmission loss P at the predetermined wavelength λ of the POF can be calculated after the following formula:

$P=[\{-10 \times \log(Li1/Li2)\}/Zp] \times 1000$

Figure 5:
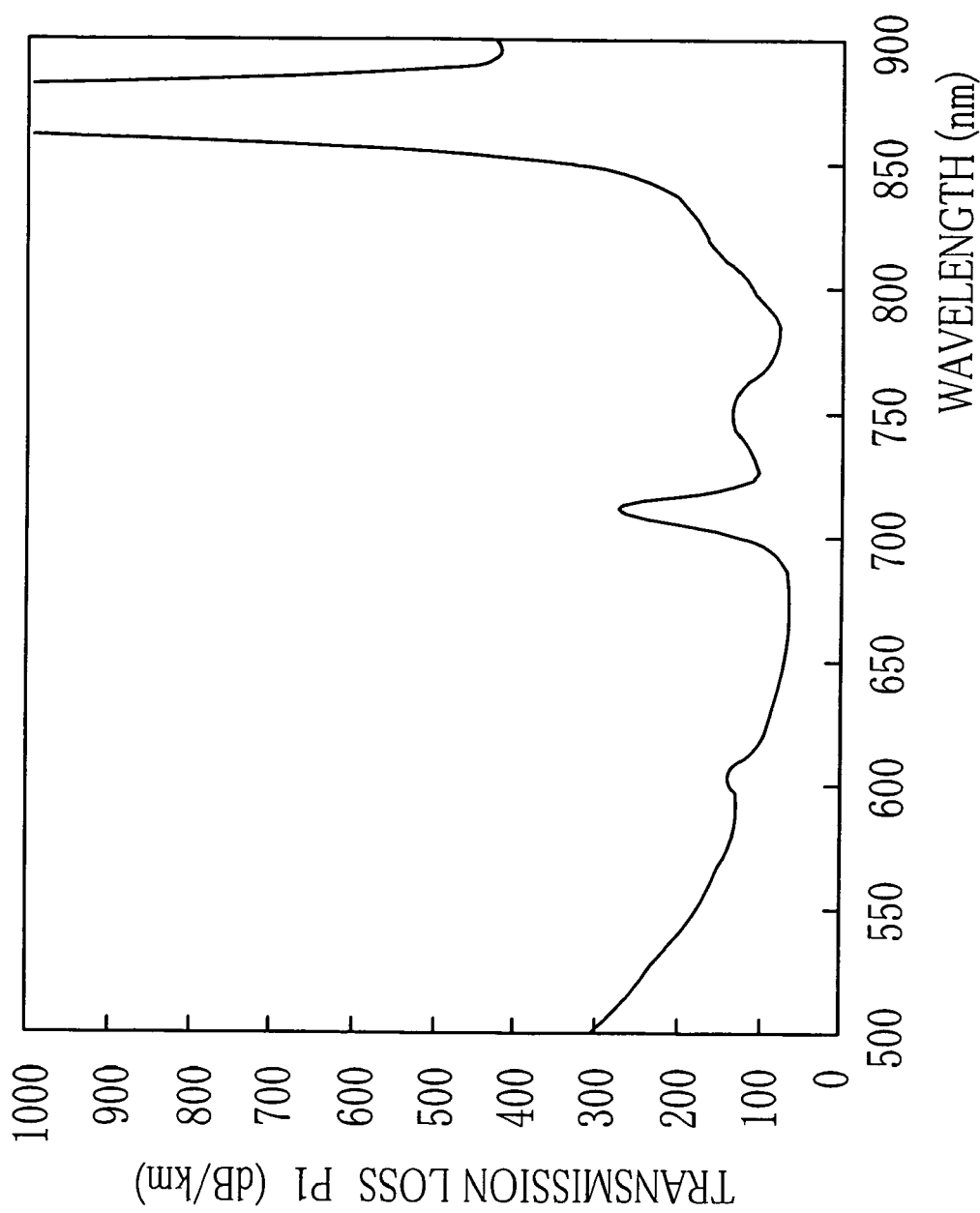
FIG. 5 is a graph illustrating a relation of a transmission loss P1 of the dried POF and a wavelength in a first embodiment.
Figure 6:
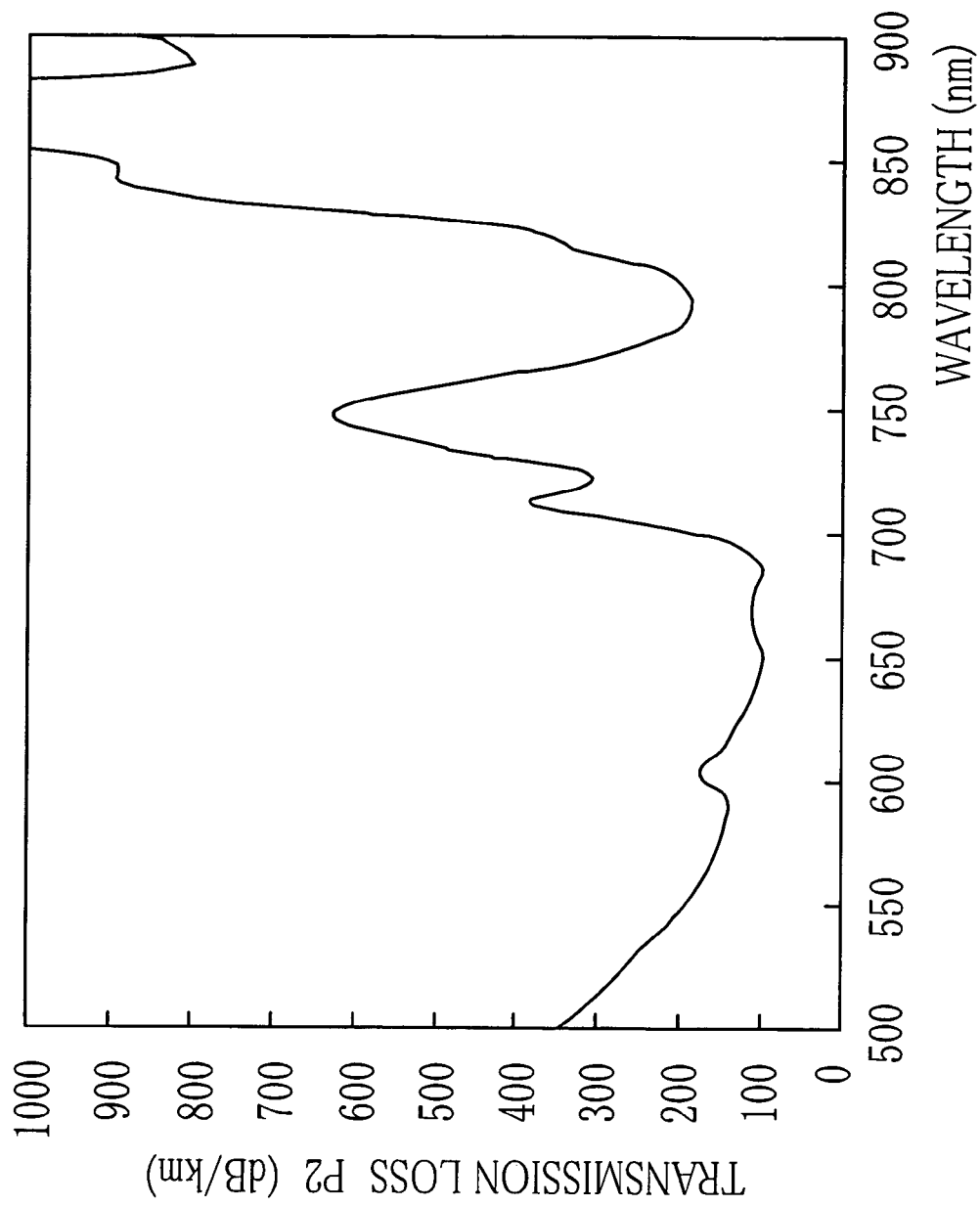
FIG. 6 is a graph illustrating a relation of a transmission loss P2 of the water saturated POF and the wavelength in the first embodiment.
Figure 7:
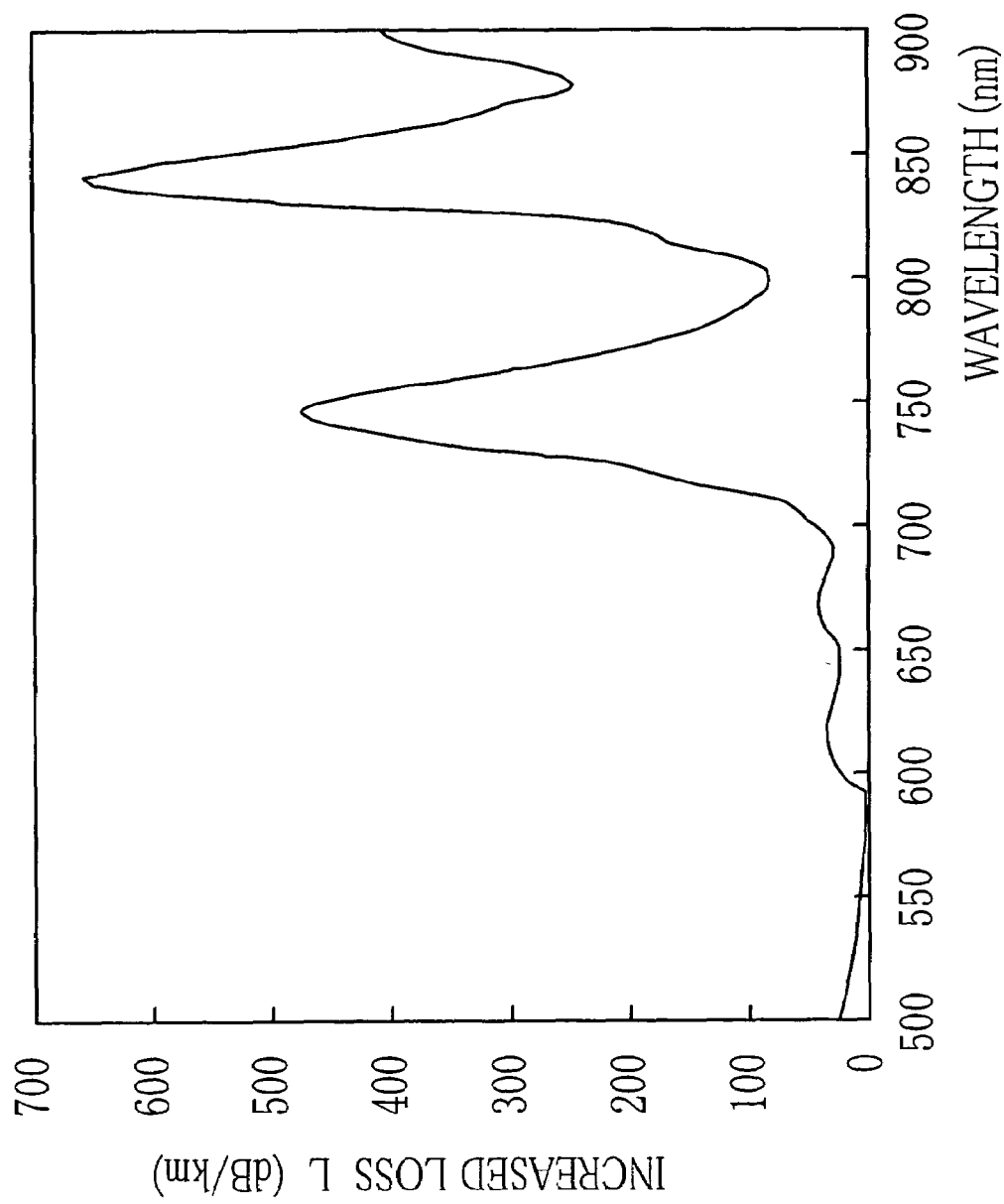
FIG. 7 is graph illustrating a relation of an increased loss L by absorbing water to the wavelength in the first embodiment.
Figure 8:
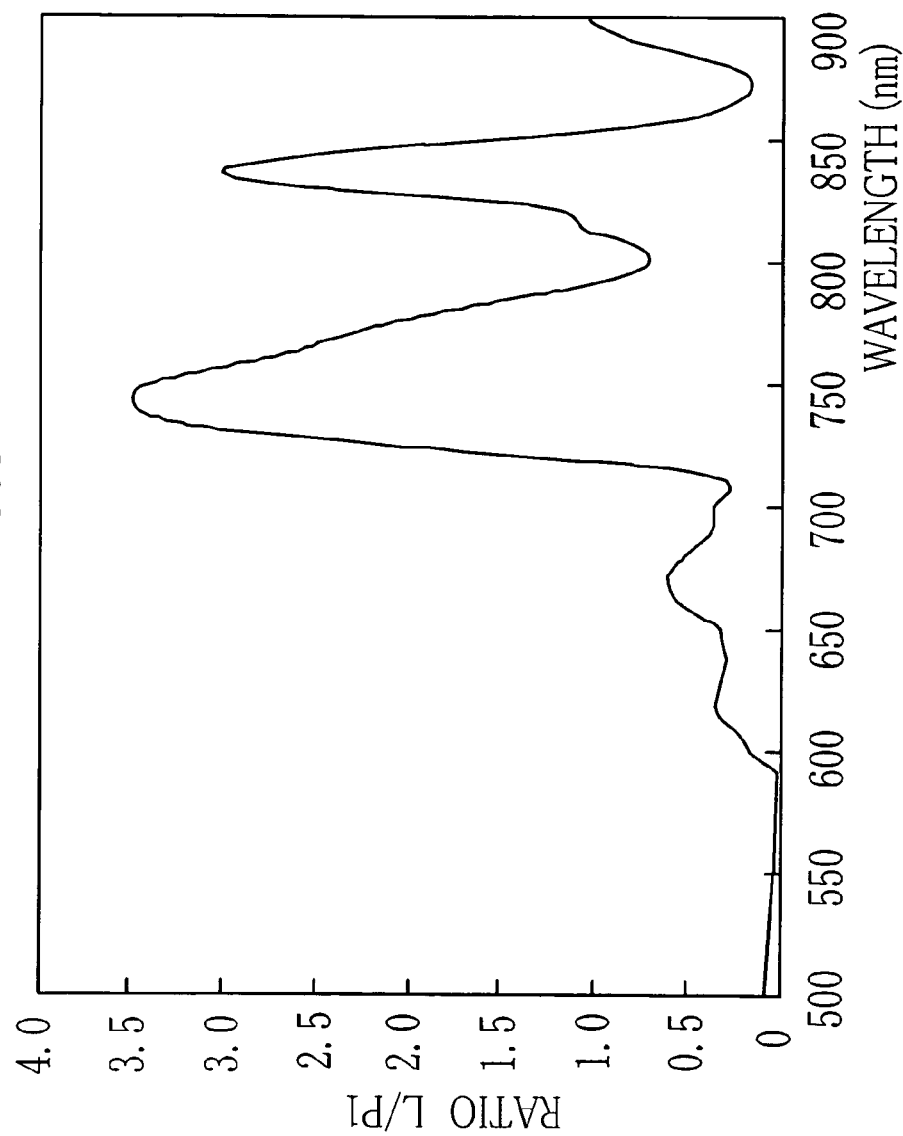
FIG. 8 is graph illustrating a relation between the wavelength and a ratio L/P1 of the increased loss and the transmission loss P1 in the first embodiment.

In each FIGS. 5–8, the data of the transmission loss P of the POF is illustrated. FIGS. 5&6 respectively illustrate the data of the transmission loss of the dried POF and the water saturated POF, in which the vertical axis is a transmission loss P1, P2 per 1 km and the horizontal axis is the wavelength λ. FIG. 7 is a graph in which the vertical axis is the increased loss L (unit; dB/km) of the transmission loss and the horizontal axis is the wavelength (unit; nm). Further, FIG. 8 is a graph illustrating a ratio of the increased loss L to the transmission loss P1 of the dried POF, in which the vertical axis is the ratio L/P1 (dimensionless) and the horizontal axis is the wavelength (unit; nm).

In the POF obtained in the above embodiment, as shown in FIG. 5, the transmission loss P1 of the dried POF is about 200 dB/km in the wavelength range of 550 nm to 850 nm, and this value is adequate in practice. However, in the wavelength range of 850 nm to 880 nm, since the vibration absorption of CH bond becomes large in effect of the light hydrogen atoms contained in the diphenylsulfide used as a dopant, the transmission loss P1 is at least 200 dB/km. This value is not adequate in practice. In FIG. 7, in the wavelength ranges of 730 nm to 760 nm, 830 nm to 870 nm and 890 nm to 900 nm, the transmission loss of the water saturated POF is at least 300 dB/km larger than the dried POF. The wavelength range in which the increased range L is less than 100 dB/km is from 500 nm to 713 nm and from 788 nm to 807 nm.

In FIG. 8, the ratio L/P1 is at least three in the wavelength range of about 730 nm to 760 and around 840 nm, and the wavelength range in which the ratio L/P1 is at most 1 is from 500 nm to 720 nm, from 790 nm to 812 nm and from 854 nm to 900 nm. Further, the wavelength range in which the transmission loss P2(=L+P1) of the water saturated POF satisfies the formula of 0<L+P1≦200 is from 550 nm to 702 nm and 785 nm to 805 nm.

As a result, when diphenyl sulfide is used as the dopant, the wavelength range in which at least one of the conditions 0≦L/P1≦1, 0≦L≦100 and 10≦L+P1≦200 is satisfied is from 500 nm to 720 nm, from 785 nm to 812 nm and 854 nm to 900 nm, and it is adequate to use the light source generating the light of the wavelength in these wavelength ranges. Further, the especially adequate light source generates the light of the wavelength in the wavelength range from 550 nm to 702 nm and from 790 nm to 805 nm, in which all of the above three conditions are satisfied. Further, the especially preferable wavelength range is from 790 nm to 805 nm, in consideration of the stability, high-speed modulation of the used light source, and a life as the light-transmitting medium. Note that the high-speed modulation is described as a number of optical signals for making the oscillation in a predetermined time, and one of the important properties of the light source in making the high speed transmission with use of the optical fiber.

Figure 9:
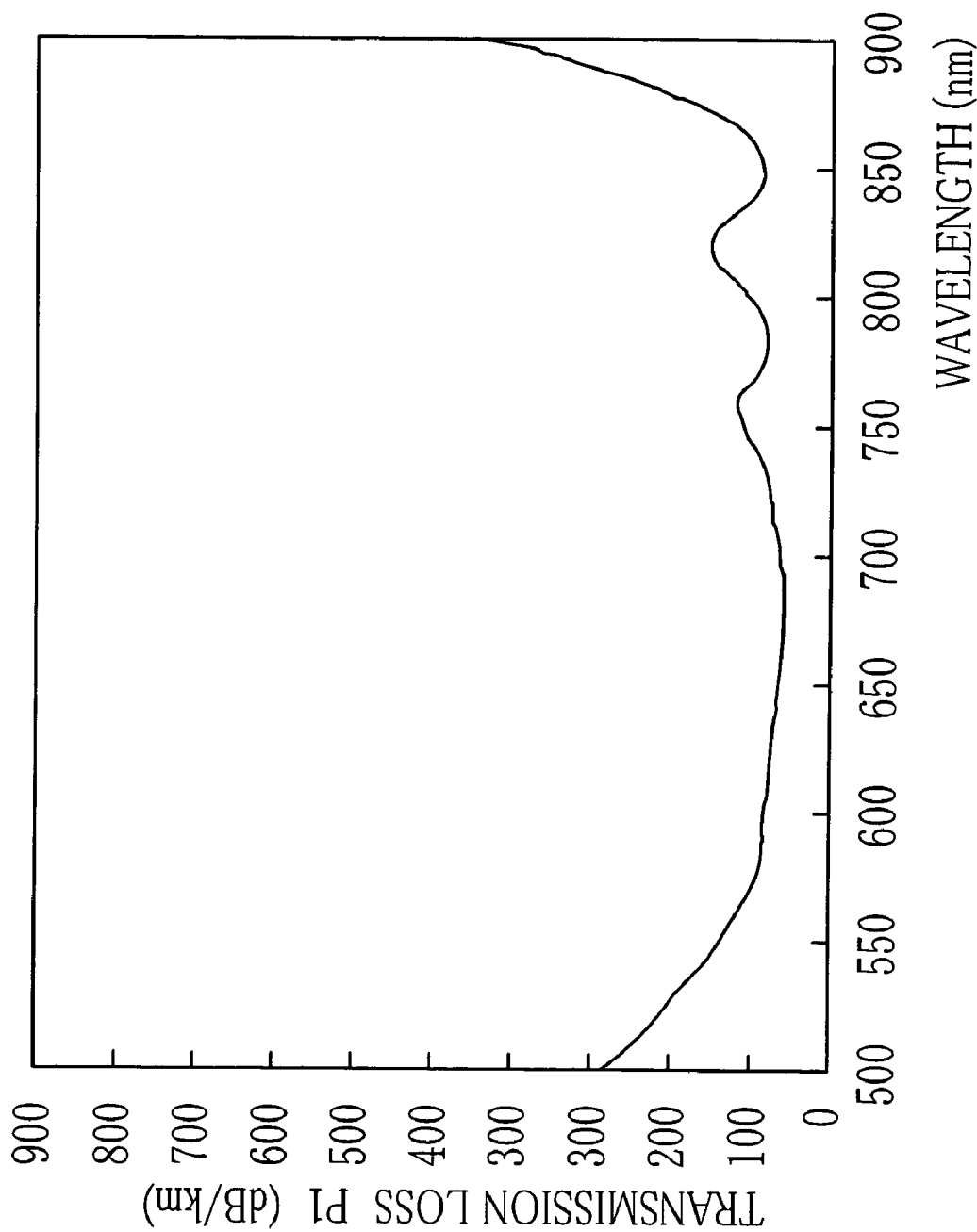
FIG. 9 is a graph illustrating a relation of a transmission loss P1 of the dried POF and a wavelength in a second embodiment.
Figure 10:
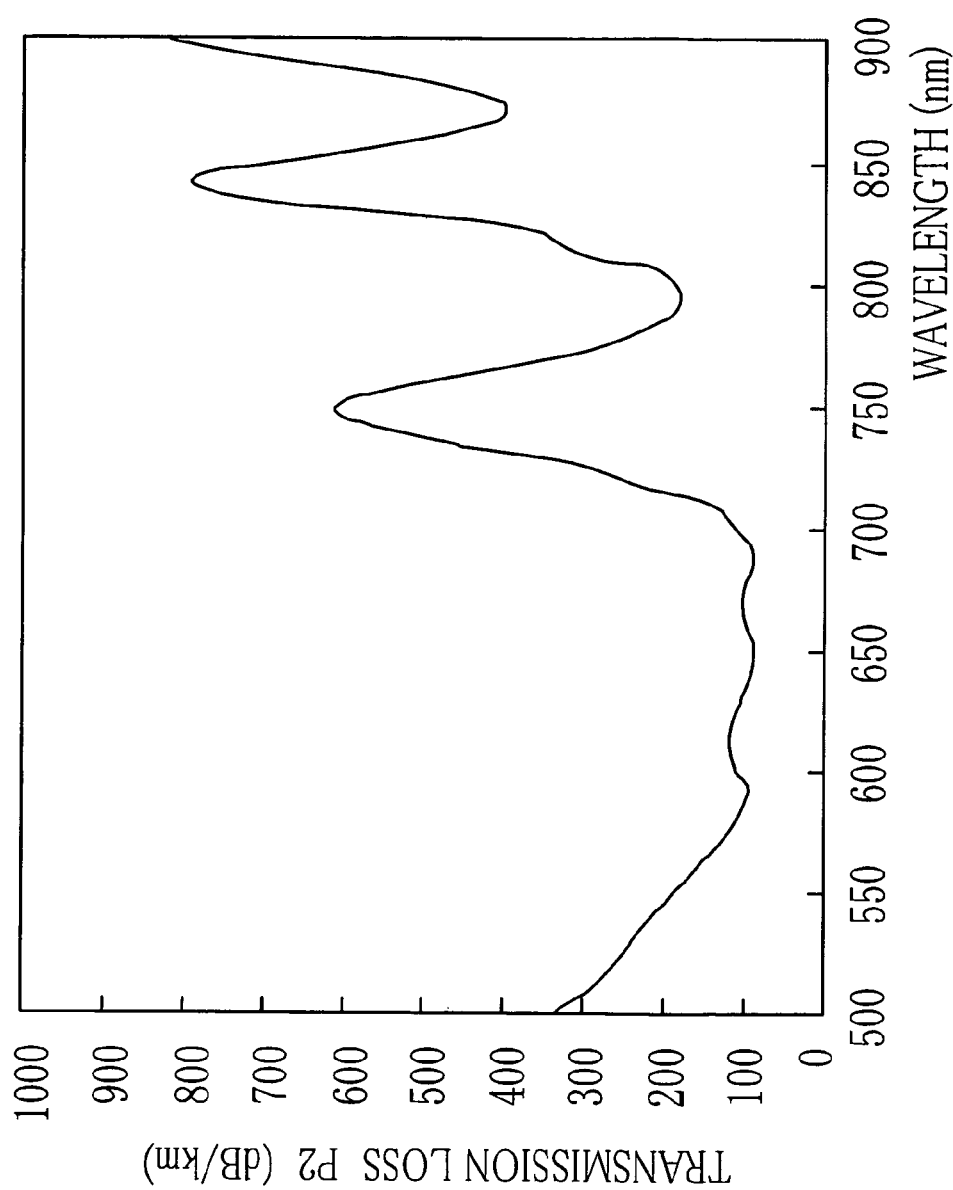
FIG. 10 is a graph illustrating a relation of a transmission loss P2 of the water saturated POF and the wavelength in the second embodiment.
Figure 11:
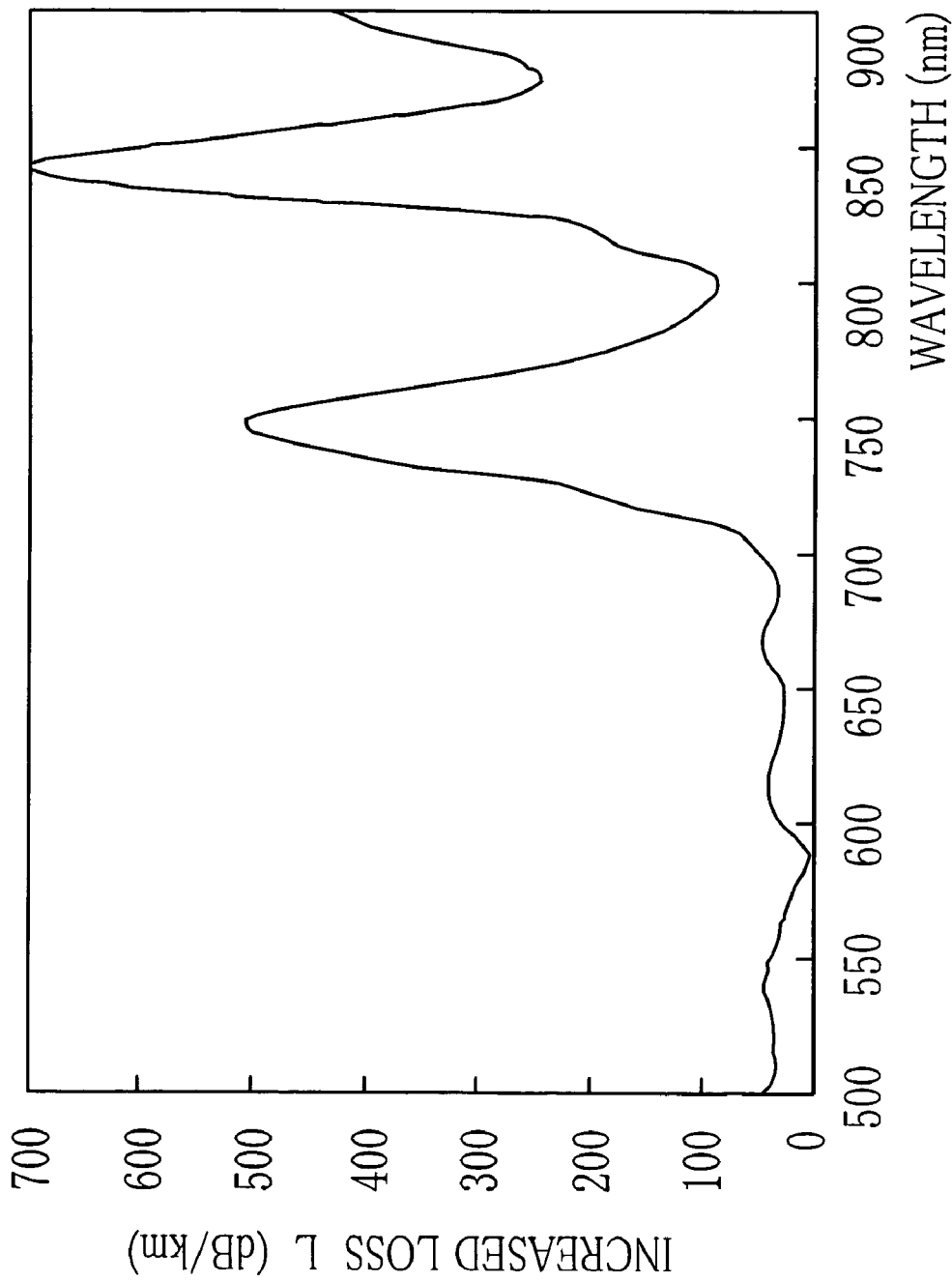
FIG. 11 is graph illustrating a relation of an increased loss L by absorbing water to the wavelength in the second embodiment.
Figure 12:
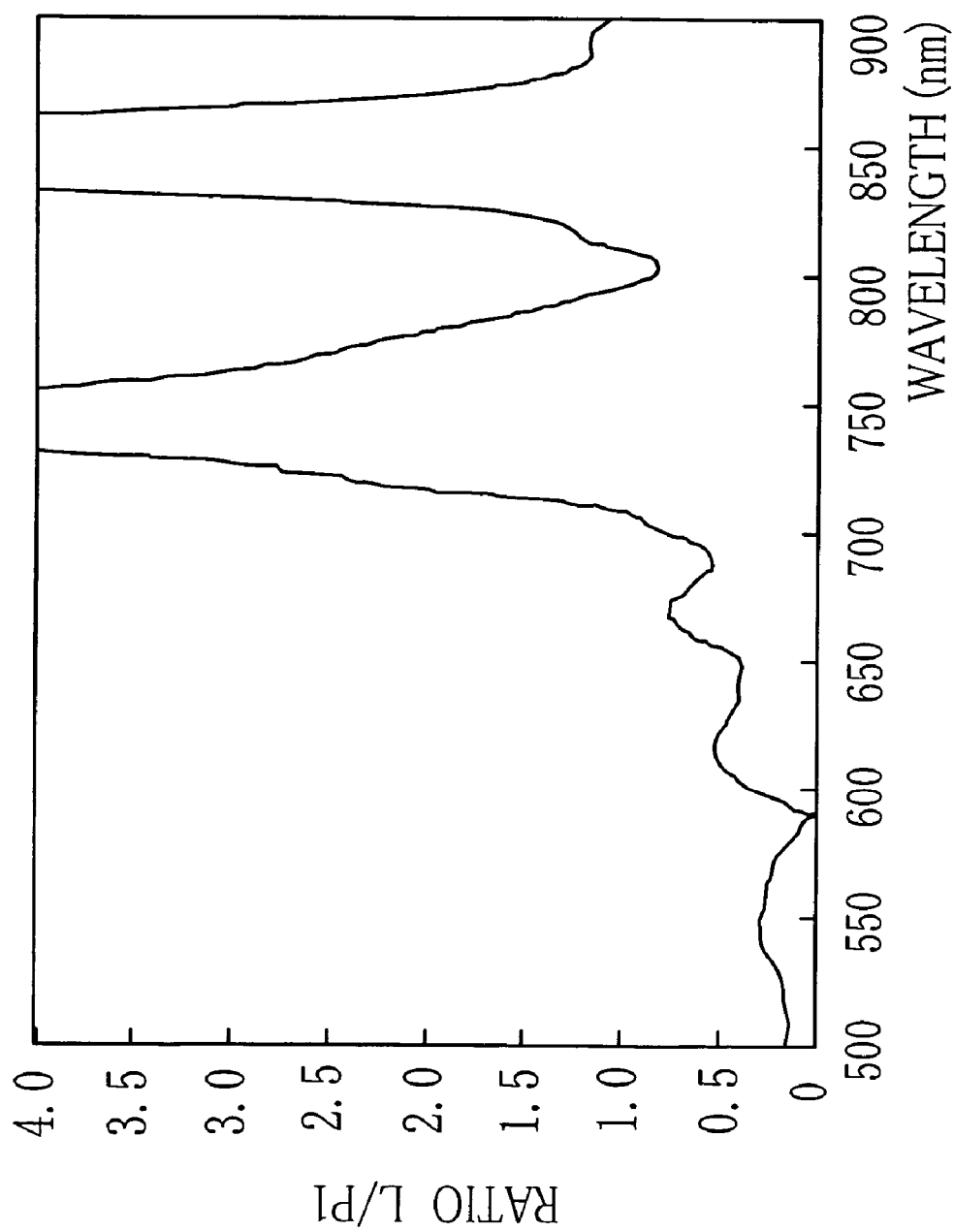
FIG. 12 is graph illustrating a relation between the wavelength and a ratio L/P1 of the increased loss and the transmission loss P1 in the second embodiment.

In the second embodiment, the completely deuterized bromobenzene is used as the dopant, and the production of the POF and the measurement of the transmission loss are made by the same methods as in the above first embodiment. The results are shown in FIGS. 9–12. FIGS. 9&10 respectively illustrate the data of the transmission loss of the dried POF and the water saturated POF, in which the vertical axis is a transmission loss P1, P2 per 1 km and the horizontal axis is the wavelength λ. FIG. 11 is a graph in which the vertical axis is the increased loss L (unit; dB/km) of the transmission loss and the horizontal axis is the wavelength (unit; nm). Further, FIG. 12 is a graph illustrating a ratio of the increased loss L to the transmission loss P1 of the dried POF, in which the vertical axis is the ratio L/P1 (dimensionless) and the horizontal axis is the wavelength (unit; nm).

In the POF obtained in the above embodiment, as shown in FIG. 9, the transmission loss of the dried POF is at most about 200 dB/km in the wavelength range of 550 nm to 850 nm, and this value is adequate in practice. In FIG. 11 obtained from FIGS. 9&10, in the wavelength ranges of 730 nm to 765 nm and 825 nm to 865 nm, the transmission loss of the water saturated POF is at least 300 dB/km larger than the dried POF. The wavelength range in which the increased range L is at most 100 dB/km is from 550 nm to 713 nm and from 792 nm to 805 nm.

In FIG. 12, the ratio L/P1 is at least three in the wavelength range of about from 725 nm to 760 and from 825 nm to 860 nm, and the wavelength range in which the ratio L/P1 is at most 1 is from 500 nm to 705 nm and from 795 nm to 810 nm. Further, the wavelength range in which the transmission loss $P2(=L+P1)$ of the water saturated POF satisfies the formula of $0<L+P1 \leq 200$ is from 550 nm to 715 nm and 785 nm to 805 nm.

As a result, when the completely deuterized bromobenzene is used as the dopant, the wavelength range in which at least one of the conditions $0 \leq L/P1 \leq 1$, $0<L \leq 100$ and $0<L+P1 \leq 200$ is satisfied is from 500 nm to 715 nm and from 785 nm to 810 nm, and it is adequate to use the light source generating the light of the wavelength in these wavelength ranges. Further, the especially adequate light source generates the light of the wavelength in the wavelength range 550 to 705 nm and from 794 nm to 805 nm, in which all of the above three conditions are satisfied.

As described above, the wavelength at which the increased loss L and the ratio L/P1 become large is the absorption wavelength of OH vibration of water absorbed to the POF. The transmission loss of the POF obtained in this embodiment in the range of 550 nm to 880 nm is low. Accordingly, the absorbed amount of the light is small. However, if the water is absorbed to the POF, a range from 550 nm to 880 nm includes wavelength ranges which are not mentioned in the above explanation. In these wavelength ranges, since the light is absorbed for the OH (hydroxyl group) vibration in water, the transmission loss extremely increases.

Consequently, in the present invention, the wavelength range without the absorption wavelength of OH vibration is a communication wavelength band, in which the transmission loss does not become larger even if the POF as the light-transmitting medium absorbs water. Further, in the communication wavelength band, the fluctuation of the transmission loss is small even of the absorbed amount of the water changes. Therefore, the stable communication can be continuously made in the communication wavelength range.

In the second embodiment, the preferable wavelength range is from 794 nm to 805 nm in consideration of the stability, high-speed modulation of the used light source, and a life as the light-transmitting medium.

As described above, when the plastic optical transmission medium such as the POF and the like is used, the absorption wavelength X of the OH vibration of absorbed water is measured, and the wavelength range except of the absorption wavelength X is determined as the communication wavelength range. Thus the increase of the transmission loss can be reduced. Note that when a communication wavelength is determined, it is preferable to consider an absorption wavelength of OH vibration caused by the chemical structure of not only the polymers of the plastic light-transmitting medium but also other compounds, such as dopant and the like as described above. As the result from the above description, the communication wavelength band is preferably from 500 nm to 720 nm and from 785 nm to 810 nm, and especially from 785 nm to 810 nm.

Note that the present invention is not restricted in the case of producing the preform 15 shown in FIG. 2, and may be applied to the case of producing a preform in which a clad portion or a core portion has a multi-layer structure. In this case, it is preferable that at least the refractive index of the core portion changes in the radius direction in section, namely in a perpendicular direction to the transmission direction of the optical path.

In the present invention, the raw materials of the clad and core portions of the preform are not especially restricted, so far as the functions of the optical transmission don't become smaller. the especially preferable materials have the high transmittance. Note that the raw materials of the clad portion is such a polymer that the refractive index of the clad portion may be smaller than that of the core portion so as to make the internal reflection on the interface between the core and the clad. Further, the materials of the clad portion and the core portion are preferably the amorphous polymer so as to prevent the scattering of the light. When the amorphous polymer used as the core portion has the water absorbance in the range of 0.01% to 5%, the effect of the present invention is extremely large. Further, the core portion and the clad portion are formed of the polymers which are excellent in the adhesiveness, the mechanical characteristics (such as a toughness and the like), and the mist-heat resistance.

For example, there are esters of (meth)acrylic acid (fluorine-free (meth)acrylic esters (a), esters of fluorine-containing (meth)acrylic (b)), styrene type compounds (c), vinylerters (d) and bisphenol A as materials of polycarbonates. Further, polyvinylidene fluoride (PVDF) is preferable as the polymer for forming the clad portion. Further, there are homopolymers obtained by polymerizing the monomers, co-polymers produced from at least two sorts of monomer, or a mixture of homopolymer and the copolymer. Among them, the preferable compounds for the light-transmitting medium contains esters of (meth)acrylic acid or fluorine-containing polymers. In following, the examples of the compounds will be described.

(a) Esters of fluorine-free (meth)acrylic are methyl methacrylate (MMA), ethyl methacrylate, isopropyl methacrylate, tert-butyl methacrylate, benzyl methacrylate, phenyl methacrylate, cyclohexyl methacrylate, diphenylmethyl methacrylate, tricyclo[5•2•1•$0^{2,6}$]decanyl methacrylate, adamantyl methacrylate, isobornyl methacrylate, norbornyl methacrylate, methyl acrylate, ethyl acrylate, tert-butyl acrylate, phenyl acrylate and the like.

(b) Esters of fluorine-containing (meth)acrylic are 2,2,2-trifluoroethyl methacrylate,2,2,3,3-tetrafluoro-propyl-methacrylate, 2,2,3,3,3-pentafluoropropyl methacrylate, 1-trifluoromethyl-2,2,2-trifluoroethyl methacrylate, 2,2,3,3, 4,4,5,5-octafluoropentyl methacrylate,2,2,3,3,4,4-hexafluorobutyl methacrylate, and the like.

Further, (c) the styrene type compounds are styrene, α-methylstyrene, chlorostyrene, bromostyrene and the like. Further, (d) the vinylerters are vinylacetate, vinylbenzoate, vinylphenylacetate, vinylchloro acetate, and the like. The materials are not restricted in them. It is sure that the sorts of the compounds are not restricted. Preferably, the sort and the ratio of the compounds are determined such that the light-transmitting medium may have the refractive index distribution.

Further, as the polymers for forming the clad portion, there are co-polymers of methylmethacrylate (MMA) and acrylate fluorides (such as trifluoroethyl methacrylate (3FMA), hexafluoroisopropyl methacrylate or the like). Further, there are co-polymers of MMA and (meth)acrylate having a branched chain (such as tert-butylmethacrylate and the like) and (meth)acrylate having alicyclic (such as isobonyl methacrylate, norbonyl methacrylate, tricyclodecanyl methacrylate and the like). Further, there are polycarbonate, norbornen type resins (for example ZEONEX (trade mark, produced by Zeon Corporation) and the like), functional norbornen type resins (for example, ARTON (produced by JSR Corporation), and the like), fluorine-contained resins (for example, polytetrafluoroethylene (PTFE), polyvinylydene fluoride (PVDF), and the like). Further, there are co-polymer of fluorine-contained resins (for example, PVDF type co-polymer), tetrafluoroethylene perfluoro (alkylvinyl ether) (PFA) random co-polymer, chlorotrifluoroethylene (CTFE) co-polymer.

Note that if these polymers contain the hydrogen atoms (H), it is preferable that the deuterium atoms (D) are substituted for the hydrogen atoms, such that the transmission loss, especially that in the wavelength in the near infrared range, may be decreased.

Further, when a near infrared ray passes through the POF, the C—H bonds in the polymer molecule causes an absorption loss. Therefore as described in the Japanese Patent Publication No. 3332922 and the Japanese Patent Laid-Open Publication No. 2003-192708, it is preferable to use the materials in which the substitution of deuterium or fluorine is made, such as the deuterated polymethyl methacrylate (PMMA-d8), polytrifluoroethyl methacrylate (P3FMA), polyhexafluoroisopropyl 2-fluoro acrylate (HFIP 2-FA). Thus the wavelength range in which the transmission loss occurs shifts into a longer wavelength side, and therefore the loss of the transmitted light is decreased. In order to keep the transparency of the materials in the polymerization, it is preferable to remove before the polymerization the impurities and the foreign materials causing the scatter.

When the polymr is produced in the polymerization of the polymerizable monomers, the polymerization initiator is used. In this case, as the polymerization initiator, there are materials generating radicals. As such materials, there are peroxide comounds, for example, benzoylperoxide (BPO), tert-butylperoxy-2-ethylhexanate (PBO), di-tert-butylperoxyde (PBD), tert-butylperoxy isopropylcarbonate (PBI), n-butyl-4,4-bis(tert-butylperoxy)varalate (PHV) and the like. Further, there are azo compounds, for example, 2,2'-azobisisobutylonytril, 2,2'-azobis(2-methylbutylonitril), 1,1'-azobis(cyclohexane-1-carbonitryl), 2,2'-azobis(2-methylpropane), 2,2'-azobis(2-methylbutane), 2,2'-azobis(2-methylpentane), 2,2'-azobis(2,3-dimethylbutane), 2,2'-azobis(2-methylhexane), 2,2'-azobis(2,4-dimethylpentane), 2,2'-azobis(2,3,3-trimethylbutane), 2,2'-azobis(2,4,4-trimethylpentane), 3,3'-azobis(3-methylpentane), 3,3'-azobis(3-methylhexane), 3,3'-azobis(3,4-dimethylpentane), 3,3'-azobis(3-ethylpentane), dimethyl-2,2'-azobis(2-methylpropionate), diethyl-2,2'-azobis(2-methylpropionate), di-tert-butyl-2,2'azobis(2-methylpropionate) and the like. Note that the polymerization initiators are not restricted in them, and two or more sorts of them can be used.

In order to keep several sorts of the physical properties (such as mechanical properties and thermal properties) of the polymer uniform, it is preferable to adjust the polymerization degree. For the adjustment, a chain transfer agent can be used. The sort and amount of the chain transfer agent can be adequately determined depending on the sort of the used polymerizable monomers. The chain transfer coefficient of the chain transfer agent can be referred to, for example, "Polymer Handbook $3^{rd}$ Edition, (J. Brandrup and E. H. Immergut, issued by John Willy&Son). Further, the chain transfer coefficient can be obtained in an experiment, with reference to "Takayuki Ohtsu, Masayoshi Kinoshita: Experiments of Polymer Synthesis, Kagakudojin".

As the chain transfer agent, there are alkylmercaptans (for example, n-butylmercaptan, n-pentylmercaptan, n-octylmercaptan, n-laurylmercaptan, tert-dodecylmercaptan and the like), thiophenols (for example, thiophenol, m-bromothiophenol, p-bromothiophenol, m-toluenethiol, p-toluenethiol and the like), and the like. Especially preferable is to use alkylmercaprans, such as n-octylmercaptan, n-laurylmercaptan, tert-dodecylmercaptan. Further, in the chain transfer agent, the deuterium atom or fluorine atom may be substituted for the hydrogen atom on C—H bond. Note that the chain transfer agent is not restricted in them, and two or more sorts thereof may be used.

The dopant has different refractive index from the polymerizable compounds. Preferably, the difference of the refractive index is at least 0.005. When the polymer contains the dopant, the refractive index becomes higher. The solubility parameter of the dopant is at most $7(cal/cm^3)^{1/2}$ different from the polymer produced in synthesizing the monomer, and the increase of the refractive index of the polymer is preferably at least 0.001 in comparison of the polymers produced from the monomers as described in Japanese Patent Publication No. 3332922 and Japanese Patent Laid-Open Publication No. 5-173026. The materials selected as the refractive index control agent may be stable also under existence of the polymer and the situation of the polymerization of the polymerizable monomer of the above materials.

The dopant may be polymerizable compounds. In this case, it is preferable that the co-polymer containing the dopant as co-polymer elements has larger refractive indexes than the polymer containing no co-polymer materials, and further satisfy the following condition. Namely, the dopant to be used in the present invention are stable under the polymerization conditions (heating, increasing pressure and the like) of the core monomers or the polymerizable monomers as the raw materials of the clad. In this embodiment, the dopant is contained in the core monomers, the progress of the polymerization is controlled in the process for formation of the core portion by an interfacial gel polymerization, and the concentration of the dopant is varied so as to provide the refractive index distribution on the basis of the concentration distribution of the dopant. Otherwise, the refractive index modifier is dispersed after the forming of the preform. The POF having the Graded-Index type core is called a Graded-Index plastic optical fiber, which has a wide transmission range.

As the dopant, there are, for example, benzyl benzoate (BEN); diphenyl sulfide (DPS); triphenyl phosphate (TPP); benzyl n-butyl phthalate (BBP); diphenyl phthalate (DPP); diphenyl (DP); diphenylmethane (DPM); tricresyl phosphate (TCP); diphenylsulfoxide (DPSO) and the like. Especially preferable dopants are BEN, DPS, TPP and DPSO. Further, tribromo phenylmethacrylate and the like can be used as the polymerizable componds. In this case, when a polymer matrix is formed, the polymerizable dopant and the polymerizable monomers are polymerized to produce copolymer. Accordingly, although the control of several properties (especially optical property) is more difficult, there can be merits of the heat resistance. In this method, the content and the distribution of the dopant is adjusted such that the predetermined refractive index of the POF may be formed.

The contents of the polymerization initiator, the chain transfer agent, and the dopant to be added are adequately determined depending on the sorts of the core monomers. In this embodiment, the content of the polymerization initiators is preferably 0.005 to 0.050% by mass to the core monomers, and particularly 0.010 to 0.020% by mass. The content of the chain transfer agent is preferably 0.10 to 0.40% by mass to the core monomer, and particularly 0.15 to 0.30% by mass. Further, the content of the dopant in the polymerizable monomers for the rod and the core tube is preferably 1 to 50% by mass.

Other additives may be contained in the core and the clad of the POF so far as the transmittance property is not decreased. For example, the stabilizers may be added to the core for increasing the resistance to climate and the durability. Further, induced emissive functional compounds may be added for amplifying the optical signal. When these compounds are added to the monomers, the attenuated signal light can be amplified in effect of an excitation light, and the transmission distance becomes larger. Therefore the POF can be used as an optical fiber amplifier for a link. These additives, after added to the polymerizable compounds as the material, are polymerized, which is contained the core and the clad.

In a method of producing the GI-POF are proposed, as described in Japanese Patent Publication No. 3332922, the clad tube is formed from a resin at first. Then the polymerizable compounds are supplied into an inside of the clad tube, and the polymerization is made by an interfacial gel polymerization method as one of bulk polymerization methods. The polymerization conditions (or the polymerization temperature and the polymerization period) are different between the monomers and the polymerization initiators to be used. Usually, the polymerization temperature is preferably at least 60° C. and at most the glass transition temperature of the polymer to be generated, and especially from 60° C. to 150° C., and the polymerization period is preferably 5 hours to 72 hours, and especially 5 hours to 48 hours. It is preferable to make the polymerization in an atmosphere of inert gas. The pressure may be increased or decreased if necessary. Otherwise, the polymerization conditions described in the brochure of International Publication under PCT No. 03/19252 can be applied to the present invention, such that the core portion can be formed without density fluctuation. Furthermore, the polymerizable compounds showing different refractive indexes after polymerization may be gradually added to form the core portion. Note that the method for producing the preform of the GI-POF used in the present invention is not restricted in the interfacial gel-polymerization method as described above. Further, the polymerizable compounds may be the mixture of a resin compound having a single refractive index and the refractive index modifier, the mixture or the copolymer that is obtained from the resins having different refractive indexes. Further, the POF includes many sorts having several profiles of the refractive indexes, namely, not only the GI-POF, but also a single mode POF, and a step index POF. The present invention can be applied to the POFs produced in these methods.

One-layer coating is made in the coating process to form the primary coated optical fiber 19, in order to increase a bending of the POF and a weather resistance, prevent the decrease of the function caused by moisture absorbance, increase a tensile strength, provide a resistance against trampling and inflammability, protect from damage by chemicals, prevent a noise caused by an exterior light, increase a commercial value by coloring and the like.

The materials of the protective coating will be described in the following. Since the compounds have high resiliency, they are also effective in the mechanical properties, such as the bending and the like. Concretely, they are isoprene type rubber (for example, natural rubber, isoprene rubber and the like), butadiene type rubber (for example, styrene-butadiene co-polymer rubber, butadiene rubber and the like), diene type specific rubber (for example, nitrile rubber, chloroprene rubber and the like), olefine type rubber (for example, ethylene-propylene rubber, acryl rubber, butyl rubber, butylhalide rubber and the like), ether type rubber, polysulfide rubber, urethane rubber and the like.

As the preferable materials for the protective coating, there are liquid rubbers which has fluidity in a room temperature and losses the fluidity by the heating to harden. Concretely, they are polydiene type (standard structure is polyisoprene, polybutadiene, butadiene-acrylonitril co-polymer, polychloroprene and the like), polyolefine type (for example, the standard structure is polyolefine, polyisobutylene and the like), polyether type (for example, the standard structure is poly(oxypropylene) and the like), polysulfide type (for example, the standard structure is poly(oxyalkylenedisulfide) and the like), polysiloxane type (for example, the standard structure is poly(dimethylsiloxane) and the like) and the like.

Further, thermoplastic elastomers (TPE) can be used. The thermoplastic elastomers have rubber-like elasticity in a room temperature, and are materials which is plasticized at a high temperature and then easily formed. Concretely, there are styrene type TPE, olefine type TPE, vinylchloride type TPE, urethane type TPE, ester type TPE, amide type TPE and the like. Note that the polymers described above are not especially restricted in these elastomers so far as the polymers can be molded at or below a glass transition temperature Tg, and copolymer or the mixture of the above or other polymers can be used.

Further, a liquid as a mixture of prepolymer and reactant can be used and hardened by heating, for forming the coating. For example, as disclosed in Japanese Patent Laid-Open Publication No. 10-158353, there is a one-component thermosetting urethane compositions produced from NCO block prepolymer and fine powder coating amine. Further, as disclosed in International Publication under PCT No. 95/26374, there is a one-component thermosetting urethane compositions produced from NCO containing urethane prepolymer and solid amine having a less than 20 μm diameter. Further, in order to improve the efficiency, additives may be added, such as a flame retardant, an antioxydant, a radical scavenger, a lubricant and the like, and several sorts of fillers composed of inorganic or organic compounds may be added.

Further, a second coating may be formed on the primary coated optical fiber, so as to obtain a secondary coated optical fiber. Accordingly, the secondary coated optical fiber is constructed the POF, the coating as a first coating provided over the POF. The second coating provided over the first coating. If the first coating has an enough thickness, the first coating protect the POF to be damaged thermally. Therefore in this case, the restriction of the temperature of the hardening the materials for the secondary coating more loose than for the primary coating. The second coating may contain the additives to the polymer, which are, for example, flame-retardant, UV-absorbant, antioxidant, radical scavenger, brighener, lubricant. These additives may be also contained in the first layer, so far as the first layer does not lose the property of moisture blockage. Note that flame-retardant is resin containing halogen such as bromine and the like, additives or containing phosphorus. However, recently, it becomes more usual to use metal hydroxide as the flame-retardant, in view of securities for such as reduction of toxic gas. In this case, the metal hydroxide contains crystallization water, which is absorbed in the production process of the metal hydroxide. As the water cannot be completely removed from the metal hydroxide, it is preferable that the metal hydroxide is contained in the second coating.

Further, in order to provide the several effects, several coating having different effects may be provided over the POF. As these coatings, for example, a barrier layer for reducing the moisture absorbance, a layer containing moisture absorbing material (for example, a moisture absorbing tape or a moisture absorbing gel), may be provided in the first coating or between the first and the second coating. Furthermore, layers containing cushioning materials, such as a plastic layer, a foam layer and the like, may be formed in order to decrease the stress in bending, and an enforcement layer and the like may be formed in order to increase the rigidity. The sort of layers to be formed is selected in accordance with the way of use. When the fiber materials, such as metallic fiber having high rigidity, a fiber having high elastic modulus, a fiber as a tension member, and the like are contained in the polymer or the plasticity resin, the mechanical strength of the obtained optical fiber cable is reinforced.

As the fiber as the tension member, there are aramid fiber, polyester fiber, polyamide fiber and the like. As the metallic fiber, there are stainless fiber, zinc alloy fiber, copper fiber and the like. However, the sorts of these fibers are not restricted in them. Further, in order to prevent the damage of the POF, the metallic pipes may be provided around the optical materials, such as the optical fiber bundle or the optical fiber cable, or the like, a support line may be provided along them, and otherwise a machine or a mechanism may be used for increasing the workability in wiring the optical materials.

Further, in accordance with the way of use, several optical devices including the POF or the optical fiber code are produced, for example, a cable assembly in which the POFs or the optical fiber codes is circularly arranged, a optical fiber ribbon in which the POFs or the optical fiber codes are arranged in line, and a cable assembly in which the optical fiber ribbons are bundled with a band, a lap sheath or the like, and so on.

Further, when an optical device including the POF is used in the optical communication system of the present invention, it is preferable to use a connector for unfailingly fixing connect portions in the optical devices. As the connecter usually known, there are several types, such as PN type, SMA type, SMI type, F05 type, MU type, FC type, SC type and the like.

In the present invention, several sorts of light emitting element can be used. However, as described Japanese Patent Laid-Open Publications No. 7-307525, 10-242558, 2003-152284, it is preferable to use a vertical cavity surface emitting laser (VSCEL) as the light source, since in the emitting element a radiation angle of the light is small, a degree of integration is increased and this laser can be driven with a relatively low electric current and change the oscillation wavelength depending on the contents of the elements.

There are several systems for transmitting the optical signals, in which are used the optical members of the present invention, such as the POF, the optical fiber cord, the optical fiber cable and the like. The system is constructed of an optical signal processing device which includes optical members and parts, such as a light emitting element, a light receiving element, an optical switch, an optical isolator, an optical integrated circuit, an optical transmitter and receiver module, and the like. Further, another type of the optical medium and the like may be used in the system, if necessary. In this case, any known techniques can be applied to the present invention. The techniques are described in, for example, "'Basic and Practice of Plastic Optical Fiber' (issued from NTS Inc.)", "'Optical Parts can be Loaded on Printed Wiring Assembly, at Last' in Nikkei Electronics, issued on Dec. 3, 2001", Pages 110–127", and soon. When the present invention is combined with the techniques in these publications, then the optical members are used for the wiring in apparatuses (such as computers and several digital apparatuses), the wiring in the vehicles and vessels, the optical linking between optical terminals and the digital device, and between the digital devices. Further, in the combination of the present invention with the above techniques, the optical members may be applied to the optical transmitting system adequate for optical transmission in short distance, for example, for data communication of large capacity, for use of control without influence of the electromagnetic wave. Concretely, the optical members produced in the present invention are applied to the optical LAN in each of or the optical LAN between houses, collective housings, fabrics, offices, hospitals, schools in an area, or the optical LAN in each of them.

Further, the other techniques to be combined are disclosed, for example, in "'High-Uniformity Star Coupler Using Diffused Light Transmission' in IEICE TRANS. ELECTRON., VOL. E84-C, No. 3, MARCH 2001, p. 339–344", "'Interconnection in Technique of Optical Sheet Bus' in Journal of Japan Institute of Electronics Packaging., Vol. 3, No. 6, 2000, p. 476–480". Further, in the other techniques, there are a disposition of the emitting elements to the waveguide surface (disclosed in Japanese Patent Laid-Open Publications No. 2003-311840); a light bus (disclosed in Japanese Patent Laid-Open Publications No. 10-123350, No. 2002-90571, No. 2001-290055 and the like); an optical branching/coupling device (disclosed in Japanese Patent Laid-Open Publications No. 2001-74971, No. 2000-329962, No. 2001-74966, No. 2001-74968, No. 2001-318263, No. 2001-311840 and the like); an optical star coupler (disclosed in Japanese Patent Laid-Open Publications No. 2000-241655); a device for optical signal transmission and a light data bus system (disclosed in Japanese Patent Laid-Open Publications No. 2002-62457, No. 2002-101044, No. 2001-305395 and the like); a processing device of optical signal (disclosed in Japanese Patent Laid-Open Publications No. 2000-23011 and the like); a cross connect system for optical signals (disclosed in Japanese Patent Laid-Open Publications No. 2001-86537 and the like); a light transmitting system (disclosed in Japanese Patent Laid-Open Publications No. 2002-26815 and the like); multi-function system (disclosed in Japanese Patent Laid-Open Publications No. 2001-339554, No. 2001-339555 and the like); and several sorts of waveguides, optical branching, optical couplers, optical multiplexers, optical demultiplexers and the like. When the present invention is combined with these techniques, the optical members produced in the present invention are used in a system of the optical transmission of high grade, in which the signal is multiply sent and received, and otherwise used for lighting, energy transmission, illumination, and sensors.

In the optical communication method of the present invention, not only the GI-POF as the above embodiment, but also the step index POF and the single mode POF can be used. Further, the present invention is not restricted in the light-transmitting medium constructed the clad tube and the core portion formed in the clad tube, but also applied to the plate like light-transmitting medium, the lens and the like. For example, in the case of the plate-like light-transmitting medium, such as the light guide and the like, the present invention can be applied when the refractive index changes in a thickness direction in at least part of the light-transmitting medium. Note that this structure of the refractive index is called axial GRIN. Further, when the light-transmitting medium has a ball-like shape, the present invention can be applied when the refractive index changes from a center toward a periphery of the light-transmitting medium. Note that this structure of the refractive index is called spherical GRIN.

In following, the example of the present invention will be explained concretely. However, the present invention is not restricted in the example.

EXAMPLE (Experiment 1)

The clad tube 12 was formed with use of a polymerization case which had enough rigidity and an inner diameter adequate for an outer diameter of the clad tube. The polymerization case was cylindrical and had an inner diameter of 22 mm and a length 600 mm. Then the water was removed from the completely deuterized methylmethacrylate (MMA-d8) such that the content thereof might be at most 100 ppm, and the MMA-d8 was mixed with several sorts of following additives. Thus a mixture was obtained, the temperature thereof was adjusted to 50° C., and a predetermined amount thereof was injected into the polymerization case. As the polymerization initiator of the MMA, dimethylazobis isobutylate was used, and the chain transfer agent, n-dodecylmercaptan was used. The contents of dimethylazobis isobutylate and n-dodecylmercaptan to the polymerization initiator were respectively 0.05% by mass and 0.4% by mass.

After the injection of the MMA solution, the deaeration of the polymerization case was made for 5 minutes with application of ultrasonic wave under the decreased pressure. Then the polymerization case was tightly stopped, and dipped in a hot water bath at 70° C. with concussion so as to make the preliminary polymerization for two hours. Thereafter, the polymerization case was horizontally disposed at 65° C., such that the lengthwise direction of the polymerization case might be the horizontal direction. In this situation, the polymer case was rotated at 3000 rpm with the heating for one hour so as to make the polymerization. Furthermore, the temperature was increased to 70° C., and the polymerization was made with the heating for four hours. Thereafter, The heating treatment was made at 90° C. for 24 hours, and the tube formed of the completely deuterized PMMA was obtained as the clad tube 12.

The clad tube 12 was removed from the polymerization case, and the heating treatment was made for two hours in a thermometeric chamber whose temperature was set to 90° C. The heating treatment is made at $9 \times 10^4$ Pa of degree of pressure reduction. Thereafter, the MMA-d8 as the core monomer and the dopant were injected in the inner space of the clad tube 12. MMA-d8 was a solution whose water content was at most 100 ppm. As the dopant, diphenyl sulfide was used, and the content thereof to the MMA-d8 was 7% by mass. Before the injection of them into the clad tube 12, the mixture solution was filtrated by a membrane filter made of ethylene tetrafluoride, which has the filtration accuracy at 0.2 µm. When the mixture solution was supplid into the clad tube after the filtration, any crack was not generated on the inner surface of the clad tube 12.

As the polymerization initiator, di-t-butylperoxide (10-hours half-life temperature was 123.7° C.) was used, and as the chain transfer agent, dodecylmercaptan was used. The contents of di-t-butylperoxide and dodecylmercaptan to the MMA-d8 were respectively 0.016% by mass, and 0.27 wt. %. The deaeration of the clad tube 12 containing the MMA-d8 was made for more than 5 minutes under the decreased pressure. Then the clad tube 12 was inserted into the glass tube 52. Then the glass tube 52 was set to the polymerization case 41. Note that the inner diameter of the glass tube 52 was 9% larger than the outer diameter of the clad tube 12.

The glass tube 52 was stationary disposed such that the lengthwise direction might be the perpendicular direction. Thereafter, the nitrogen gas was substituted for the air, and then the 0.05 MPa pressure was applied to make the polymerization with the heating at 100° C. for 48 hours. Thereafter, the heating treatment was made at 120° C. for 24 hours. After the completion of the polymerization, the temperature was decreased to 80° C. at a cooling speed of 0.01° C./min with keeping the pressure to 0.05 MPa. Thus the preform 15 was obtained.

In the preform 15, if the shrink in the polymerization of the core monomers would have occurred, the voids would have been observed at the completion of the polymerization. However, any voids were not recognized. The obtained preform 15 was drawn with the heating at 230° C. to form the POF 17 having the diameter about 400 µm to 500 µm. In the drawing process 16, the generating of the voids was not observed, and the POF 17 whose length was 500 m was stably obtained.

The obtained POF 17 was dried in the thermometeric chamber. In the drying conditions, the drying temperature was 25° C., the degree of pressure reduction was $9 \times 10^4$ Pa, and the drying period was 100 hours. Thereafter, the wavelength spectrum of the transmission loss was measured in the wavelength range of 600 nm to 900 nm, and the data of the transmission loss P1 of the dried POF was obtained. As the measuring apparatus, a spectrum analyzer (type; AQ6315B, produced by Ando Electric Co., Ltd.) was used.

Then, the water absorbing treatment of the POF 17 was made at 40° C. for 240 hours in the thermometeric chamber of relative humidity of 95%. Thereafter, the same spectrum analyzer was used to measure the wavelength spectrum of the transmission loss in the wavelength range of 600 nm to 900 nm, and the data of the transmission loss P2 of the water saturated POF. These data of the transmission losses P1, P2 are shown in FIGS. 5&6.

On the basis of the data of the transmission losses P1, P2, the increased loss L was obtained, and the relations of the increased loss L and the ratio L/P1 are respectively shown in FIGS. 7&8.

[Experiment 2]

The dopant was changed from diphenyl sulfide to completely deuterized bromobenzene. Other conditions were the same as in Experiment 1. The obtained data of the transmission losses were shown in FIGS. 9–12.

The result of Experiment 1 shows that the transmission loss of the water saturated POF was at most 200 dB/km in the wavelength ranges of 550 nm to 702 nm and 785 nm to 805 nm. In each of the respective wavelength range, a wavelength of lower transition loss were 684 nm and 791 nm, at which the transmission losses were respectively 93 d/Bkm and 177 dB/km, is determined in consideration of both the absorption by the OH vibration and the standard transmission loss. Further, the result of Experiment 2 shows that the transmission loss of the water saturated POF was at most 200 dB/km in the wavelength ranges of 550 nm to 715 nm and 792 nm to 805 nm. In the respective wavelength ranges, the wavelength of lower transition loss of both the absorption by the OH vibration and the standard transmission loss was 652 nm and 795 nm, at which the transmission losses were respectively 90 d/Bkm and 178 dB/km. These wavelengths are in the wavelength range in which is small the influence of the absorption wavelength of OH vibration in water absorbed into the POF. Therefore the stable communication can be made continuously.

Note that although the POF is used in the optical communication system in this embodiment, the present invention is not restricted in it but applied to several optical communication system, in which several sorts of the light-transmitting mediums are used. As the light-transmitting mediums, there are, for example, a light guide, a plane lens, a spherical lens, an aspheric lens, a fiber laser, a fiber amplifier, a filter and the like. In the present invention, plural sorts of the light-transmitting mediums may be combined. As examples of such combinations, there are a combination of the optical fiber, the fiber laser, the fiber amplifier, and the lens.

Various changes and modifications are possible in the present invention and may be understood to be within the present invention.

What is claimed is:

1. An optical communication system comprising:
   a plastic light-transmitting medium for transmitting a light from an infrared ray to a ultraviolet ray in a communication wavelength band from which a wavelength X (nm) is excluded;
   wherein said wavelength X (nm) is a wavelength of said light to be absorbed for hydroxyl group vibration in water contained in said plastic light-transmitting medium.

2. An optical communication system as defined in claim 1, wherein when a transmission loss of a light through said plastic light-transmitting medium after dried is P1 (unit; dB/km) and a difference of said transmission loss from said plastic light-transmitting medium after saturated with water to that said plastic light-transmitting medium after dried is L (unit; dB/km), said transmission loss P1 or said difference L satisfies at least one of following conditions:

$$0 \leq L/P1 \leq 1;$$

$$0 < L \leq 100; \text{ and}$$

$$0 < L+P1 \leq 200.$$

3. An optical communication system as defined in claim 1, wherein said communication wavelength is in at least one of regions of 500 nm to 720 nm and 785 nm to 810 nm.

4. An optical communication system as defined in claim 3, wherein said communication wavelength is in the range of 785 nm to 810 nm.

5. An optical communication system as defined in claim 1, wherein at least a light guide portion of said plastic light-transmitting medium is formed of an amorphous polymer containing deuterium atoms.

6. An optical communication system as defined in claim 5, wherein a water absorption of said amorphous polymer is in the range of 0.01% to 5%.

7. An optical communication system as defined in claim 1,
   wherein said plastic light-transmitting medium has a first portion for transmitting said light and a second portion whose refractive index is lower than that of said first portion; and
   wherein said refractive index of said first portion continuously varies in a direction perpendicular to a direction of the light transmitting.

8. An optical communication system as defined in claim 1, wherein said plastic light-transmitting medium is a plastic optical fiber.

* * * * *